United States Patent
Liu et al.

(10) Patent No.: US 11,272,173 B2
(45) Date of Patent: Mar. 8, 2022

(54) EXTENDED APPLICATION OF COMBINED INTRA-INTER PREDICTION

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Jizheng Xu, San Diego, CA (US); Yue Wang, Beijing (CN); Na Zhang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/322,579

(22) Filed: May 17, 2021

(65) Prior Publication Data
US 2021/0274167 A1 Sep. 2, 2021

Related U.S. Application Data

(63) Continuation of application No. PCT/CN2020/074151, filed on Feb. 2, 2020.

(51) Int. Cl.
*H04N 19/107* (2014.01)
*H04N 19/159* (2014.01)
(Continued)

(52) U.S. Cl.
CPC ......... *H04N 19/107* (2014.11); *H04N 19/159* (2014.11); *H04N 19/176* (2014.11);
(Continued)

(58) Field of Classification Search
None
See application file for complete search history.

(56) References Cited

U.S. PATENT DOCUMENTS 9,554,150 B2   1/2017   Zhang et al.
9,609,343 B1   3/2017   Chen et al.
(Continued)

FOREIGN PATENT DOCUMENTS

CN   101491107 A   7/2009
CN   101877785 A   11/2010
(Continued)

OTHER PUBLICATIONS

Non-Final Office Action from U.S. Appl. No. 17/356,220 dated Aug. 19, 2021.
(Continued)

*Primary Examiner* — Christopher G Findley
(74) *Attorney, Agent, or Firm* — Perkins Coie LLP

(57) ABSTRACT

The present application relates to extended application of combined intra-inter prediction. A method for processing video includes: storing a combined inter-intra prediction (CIIP) flag and/or intra mode of the CIIP mode with motion information in a history-based motion vector prediction (HMVP) table; and performing, at least based on the HMVP table, a conversion between a current block in a video data and a bitstream representation of the current block.

20 Claims, 27 Drawing Sheets

(51) Int. Cl.
*H04N 19/176* (2014.01)
*H04N 19/513* (2014.01)
*H04N 19/58* (2014.01)
*H04N 19/96* (2014.01)

(52) U.S. Cl.
CPC ........... *H04N 19/521* (2014.11); *H04N 19/58* (2014.11); *H04N 19/96* (2014.11)

(56) References Cited

U.S. PATENT DOCUMENTS

| | | | |
|---|---|---|---|
| 10,165,283 | B1 | 12/2018 | Chen et al. |
| 10,757,420 | B2 | 8/2020 | Zhang et al. |
| 2011/0280304 | A1 | 11/2011 | Jeon et al. |
| 2017/0180738 | A1* | 6/2017 | Park ..................... H04N 19/107 |
| 2017/0230685 | A1 | 8/2017 | Gisquet et al. |
| 2017/0251213 | A1 | 8/2017 | Ye et al. |
| 2017/0324972 | A1 | 11/2017 | Park et al. |
| 2017/0347094 | A1 | 11/2017 | Su et al. |
| 2018/0324452 | A1 | 11/2018 | Park et al. |
| 2018/0376148 | A1 | 12/2018 | Zhang et al. |
| 2019/0045184 | A1 | 2/2019 | Zhang et al. |
| 2019/0320203 | A1 | 10/2019 | Chiang et al. |
| 2020/0112741 | A1* | 4/2020 | Han ...................... H04N 19/172 |
| 2020/0314432 | A1 | 10/2020 | Wang et al. |
| 2021/0105485 | A1 | 4/2021 | Zhang et al. |

FOREIGN PATENT DOCUMENTS

| | | |
|---|---|---|
| CN | 102422640 A | 4/2012 |
| CN | 106027065 A | 10/2016 |
| CN | 107005692 A | 8/2017 |
| CN | 107113425 A | 8/2017 |
| CN | 107371030 A | 11/2017 |
| CN | 107995489 A | 5/2018 |
| CN | 108702515 A | 10/2018 |
| EP | 1753242 A2 | 2/2007 |
| EP | 2897365 A1 | 7/2015 |
| WO | 2013081365 A1 | 6/2013 |
| WO | 2017209328 A1 | 12/2017 |
| WO | 2018237299 A1 | 12/2018 |

OTHER PUBLICATIONS

Non-Final Office Action from U.S. Appl. No. 17/356,175 dated Oct. 15, 2021.
Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA Jan. 9-18, 2019, JVET-M1001, 2019.
Bross et al. "Versatile Video (Draft 6)," Joint Video Experts Team (JVET) of ITU-T SG 16 WP 3 and ISO/IEC JTC 1/SC 29/WG 11, 15th Meeting, Gothenburg, SE, Jul. 3-12, 2019, document JVET-O2001, 2019.
Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Chen et al. "CE4: Symmetrical MVD Mode (Test 4.4.3)," Joint Video Experts Team (JVET) of ITU-T SG 16 WP 3 and ISO/IEC JTC 1/SC 29/WG 11, 13th Meeting, Marrakech, MA Jan. 9-18, 2019, document JVET-M0481, 2019.
Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.
Dias et al. "CE10: CIIP Using Explicit Signaling of Weights (CE10-1.2)," Joint Video Experts Team (JVET) of ITU-T SG 16 WP 3 and ISO/IEC JTC 1/SC 29/WG 11, 14th Meeting: Geneva, CH, Mar. 19-27, 2019, document JVET-N0298, 2019.
"High Efficiency Video Coding" Series H: Audiovisual and Multimedia Systems: Infrastructure of Audiovisual Services—Coding of Moving Video, ITU-T, H.265, 2019.
Hsiao et al. "CE4.4.12: Pairwise Average Candidates," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0090, 2018.
Jeong et al. "CE4 Ultimate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2016, document JCTVC-Y1002, 2016.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.
Xu et al. "CE4-Related: History Based Spatial-Temporal MV Prediction," Joint Video Experts Team (JVEI) of ITU-T SG 16 WP 3 and ISO/IEC JTC 1/SC 29/WG 11, 12th Meeting, Macao, CN, Oct. 3-12, 2018, document JVET-L0302, 2018.
Zhang et al. "CE4-Related: History-Based Motion Vector Prediction," Joint Video Experts Team (JVET) of ITU-T SG 16 WP 3 and ISO/IEC JTC 1/SC 29/WG 11, 11th Meeting, Ljubljana, SI Jul. 10-18, 2018, document JVET-K0104, 2018.
JEM-7.0: https://jvet.hhi.fraunhofer.de/svn/svn_HMJEMSoftware/tags/ HM-16.6-JEM-7.0.
https://vegit.hhi.fraunhofer.de/jvet/VVCSoftware_VTM/tags/VTM-3.1.
https://vcgit.hhi.fraunhofer.de/jvet/VVCSoftware_VTM/-/tags/VTM-6.0rc1.
International Search Report and Written Opinion from International Patent Application No. PCT/CN2020/074150 dated Apr. 26, 2020 (11 pages).
International Search Report and Written Opinion from International Patent Application No. PCT/CN2020/074151 dated Apr. 24, 2020 (11 pages).
International Search Report and Written Opinion from International Patent Application No. PCT/CN2020/080631 dated Jun. 30, 2020 (12 pages).
International Search Report and Written Opinion from International Patent Application No. PCT/CN2020/080632 dated Jun. 29, 2020 (10 pages).

\* cited by examiner

EXTENDED APPLICATION OF COMBINED INTRA-INTER PREDICTION

CROSS REFERENCE TO RELATED APPLICATIONS

This application is a continuation of International Patent Application No. PCT/CN2020/074151, filed on Feb. 2, 2020, which claims the priority to and benefits of International Patent Application No. PCT/CN2019/074425, filed on Feb. 1, 2019, International Patent Application No. PCT/CN2019/079148, filed on Mar. 21, 2019, and International Patent Application No. PCT/CN2019/100616, filed on Aug. 14, 2019. All the aforementioned patent applications are hereby incorporated by reference in their entireties.

TECHNICAL FIELD

This document is related to video and image coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which combined intra inter prediction is used.

In one example aspect, a method of processing video is disclosed. The method includes determining a coded mode of a first video block; constraining one or more flags to an operational state based on the determination of the coded mode of the first video block, the operational state being false or true; and performing further processing of a second video block in accordance with the operational state of the one or more flags, wherein the first video block is a neighboring video block or a reference video block in relation to the second video block.

In another example aspect, a method of processing video includes determining pairwise prediction or combined-bi prediction are used in relation to a first video block; determining an operational state of combined inter-intra prediction (CIIP) based on the determination that pairwise prediction or combined-bi prediction are used, wherein the operational state is enabled or disabled; and performing further processing of the first video block in accordance with the operational state of CIIP.

In another example aspect, another method of video processing disclosed. The method includes performing a conversion between a video block of a video and a coded representation of the video block using a combine intra and inter prediction mode in which the coded representation corresponds to a weighted average of intra and inter prediction results of the video block using a weight pair from a set of weight pairs in which less than three pairs are included.

In another example aspect, another method of video processing disclosed. The method includes performing a conversion between a video block of a video and a coded representation of the video block using a combine intra and inter prediction mode in which the coded representation corresponds to a weighted average of intra and inter prediction results of the video block using a weight pair from a set of weight pairs determined due to coding information of one or more neighboring blocks.

In another example aspect, another method of video processing disclosed. The method includes determining, during a conversion between a first block in a video data and a bitstream representation of the first block, one or more coded modes of one or more second blocks; determining, based on the one or more coded modes of the one or more second blocks, a coded mode constraint of the first block; and performing, at least by applying the coded mode constraint of the first block, the conversion; wherein the one or more second blocks comprise at least one of an adjacent block, a non-adjacent block, and a reference block of the first block.

In another example aspect, another method of video processing disclosed. The method includes performing a conversion between a current block in a video data and a bitstream representation of the current block by using at least one of a combined inter-intra prediction (CIIP), a diffusion filtering, a bilateral filtering, a transform domain filtering, or another type of post-reconstruction filtering that is different from the diffusion filtering, the bilateral filtering and the transform domain filtering, wherein reconstructed neighboring samples of the current block used in at least one of the combined inter-intra prediction (CIIP), the diffusion filtering, the bilateral filtering, the transform domain filtering, or the another type of post-reconstruction filtering are replaced by approximated samples generated from the corresponding samples of the reconstructed neighboring samples in one or more reference pictures.

In another example aspect, another method of video processing disclosed. The method includes storing a combined inter-intra prediction (CIIP) flag and/or intra mode of the CIIP mode with motion information in a history-based motion vector prediction (HMVP) table; and performing, at least based on the HMVP table, a conversion between a current block in a video data and a bitstream representation of the current block.

In another example aspect, another method of video processing disclosed. The method includes determining, during a conversion between a current block in a video data and a bitstream representation of the current block, a prediction mode for the current block; determining applicability of a combined inter-intra prediction (CIIP) mode indicating that the CIIP mode is enabled for the current block in response to the determination that the current block is coded with an advanced motion vector prediction (AMVP) mode or a merge mode; and performing, based on the applicability of the CIIP mode, the conversion.

In another example aspect, another method of video processing disclosed. The method includes determining, during a conversion between a current block in a video data and a bitstream representation of the current block, a type of a selected merge candidate for the current block, and determining, applicability of combined inter-intra prediction (CIIP) for the current block according to the type of the selected merge candidate, wherein the current block is coded in merge mode.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. SUMMARY

This document is related to video coding technologies. Specifically, it is related to combined intra inter prediction (CIIP) in video coding or decoding. It may be applied to the existing video coding standard like HEVC, or the standard (Versatile Video Coding) to be finalized. It may be also applicable to future video coding standards or video codec.

2. BACKGROUND

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC [1] standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 19:
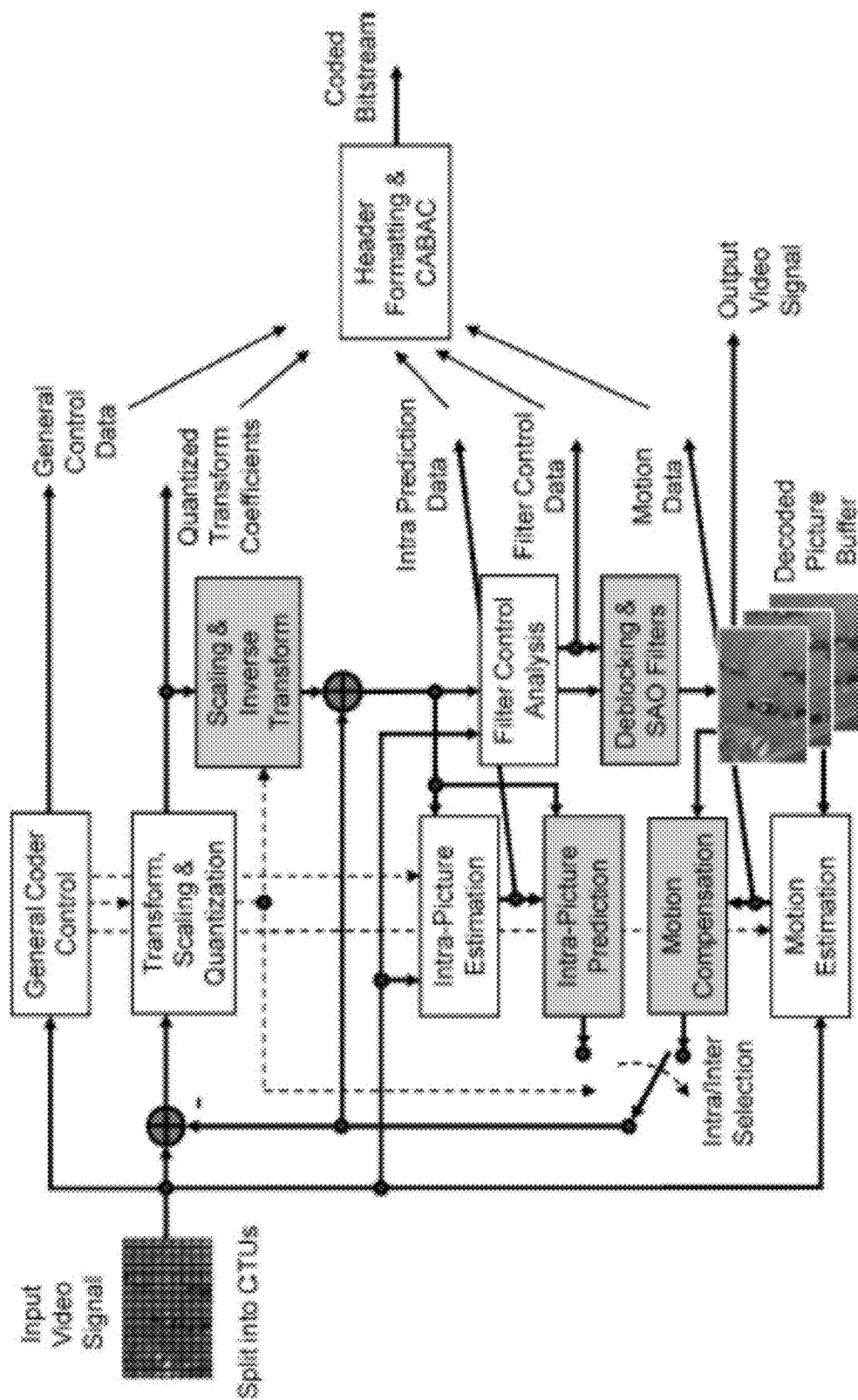
FIG. 19 shows a block diagram of an example implementation of a video encoder.

FIG. 19 is a block diagram of an example implementation of a video encoder. FIG. 19 shows that the encoder implementation has a feedback path built in in which the video encoder also performs video decoding functionality (reconstructing compressed representation of video data for use in encoding of next video data).

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode 2.1.1.1 Derivation of Candidates for Merge Mode

Figure 1:
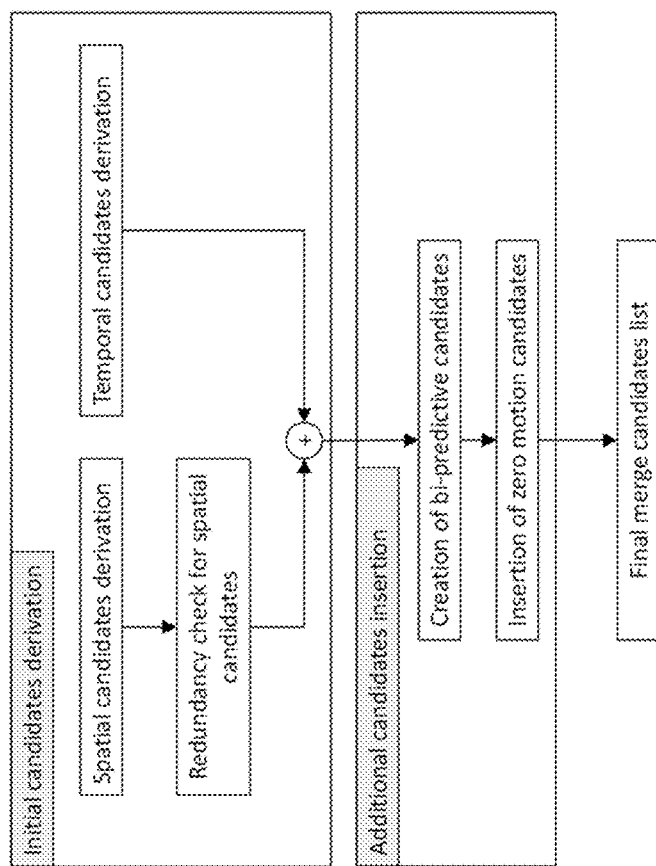
FIG. 1 shows an example of a derivation process for merge candidates list construction.

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2 Spatial Candidates Derivation

Figure 3:
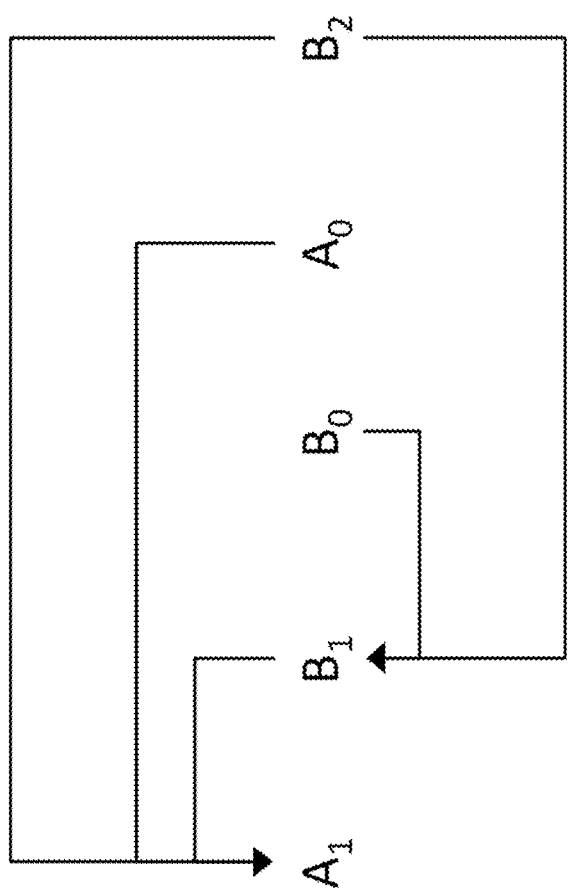
FIG. 3 shows an example of candidate pairs considered for a redundancy check of spatial merge candidates.
Figure 4:
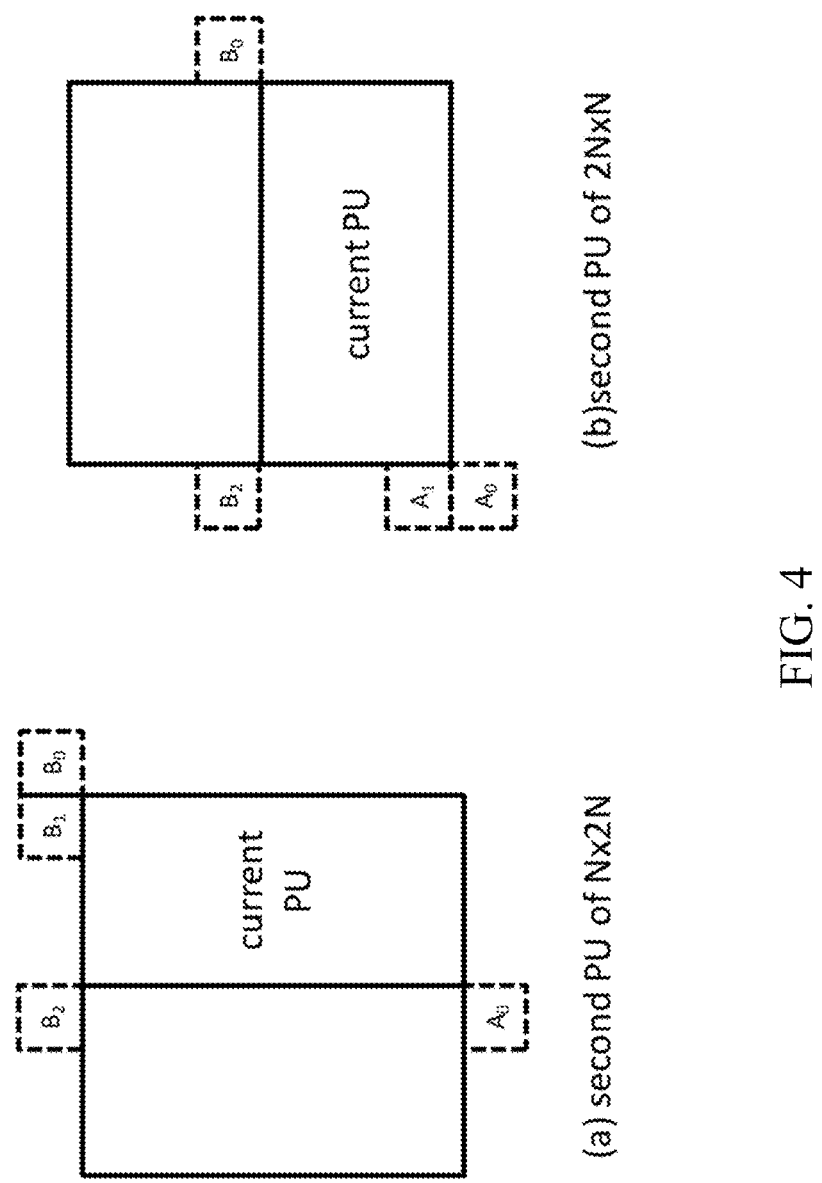
FIG. 4 shows an example of positions for second PU of N×2N and 2N×N partitions.
Figure 22:
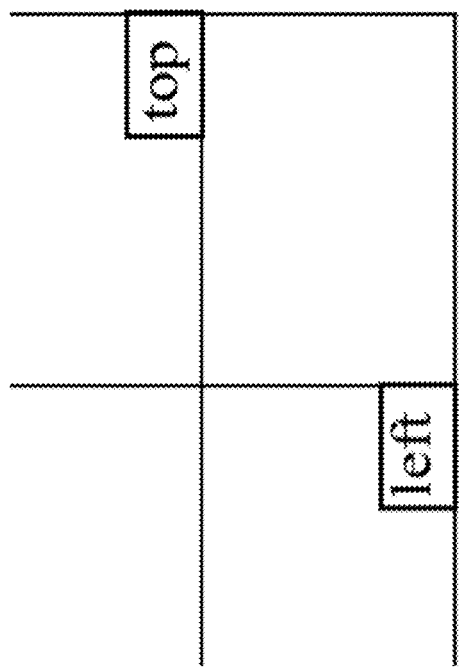
FIG. 22 shows an example of top and left neighboring blocks used in CIIP weight evaluation.

In the derivation of spatial merge candidates, a maximum of four merge candidates are selected among candidates located in the positions depicted in FIG. 22. The order of derivation is A1, B1, B0, A0 and B2. Position B2 is considered only when any PU of position A1, B1, B0, A0 is not available (e.g. because it belongs to another slice or tile) or is intra coded. After candidate at position A1 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position A1 is not considered for list construction. In fact, by adding this candidate will lead to two prediction units having the same motion information, which is redundant to just have one PU in a coding unit. Similarly, position B1 is not considered when the current PU is partitioned as 2N×N.

2.1.1.3 Temporal Candidates Derivation

Figure 5:
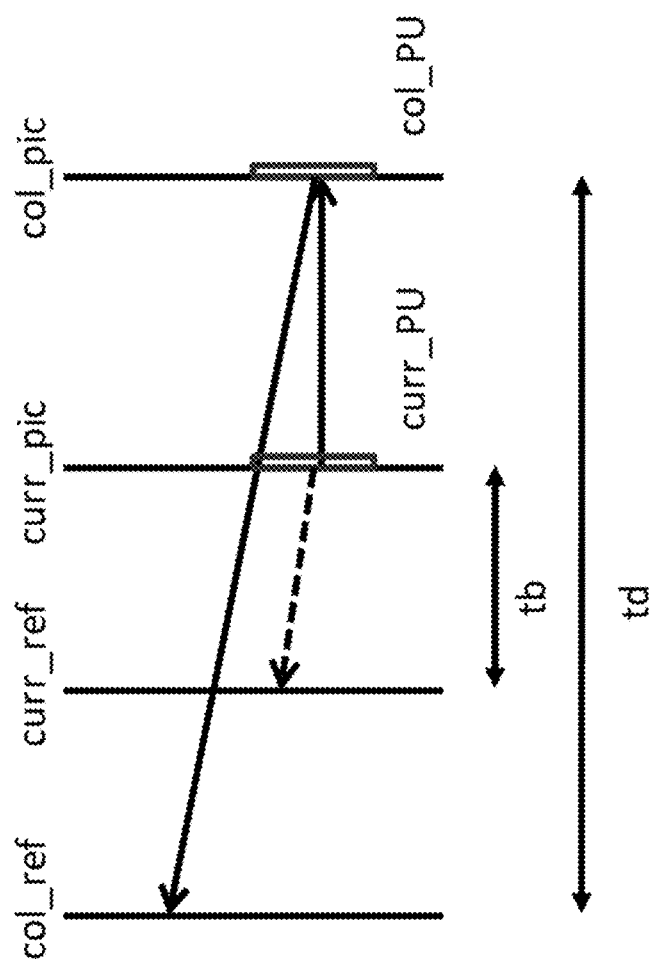
FIG. 5 shows an example of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
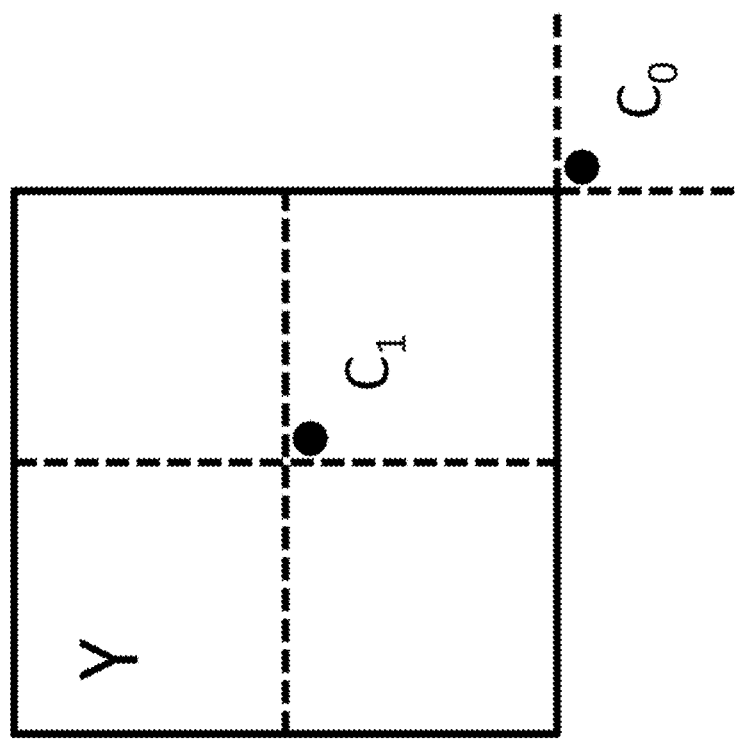
FIG. 6 shows an example of candidate positions for temporal merge candidate, C0 and C1.

In the co-located PU (Y) belonging to the reference frame, the position for the temporal candidate is selected between candidates C0 and C1, as depicted in FIG. 6. If PU at position C0 is not available, is intra coded, or is outside of the current CTU row, position C1 is used. Otherwise, position C0 is used in the derivation of the temporal merge candidate.

2.1.1.4 Additional Candidates Insertion

Figure 7:
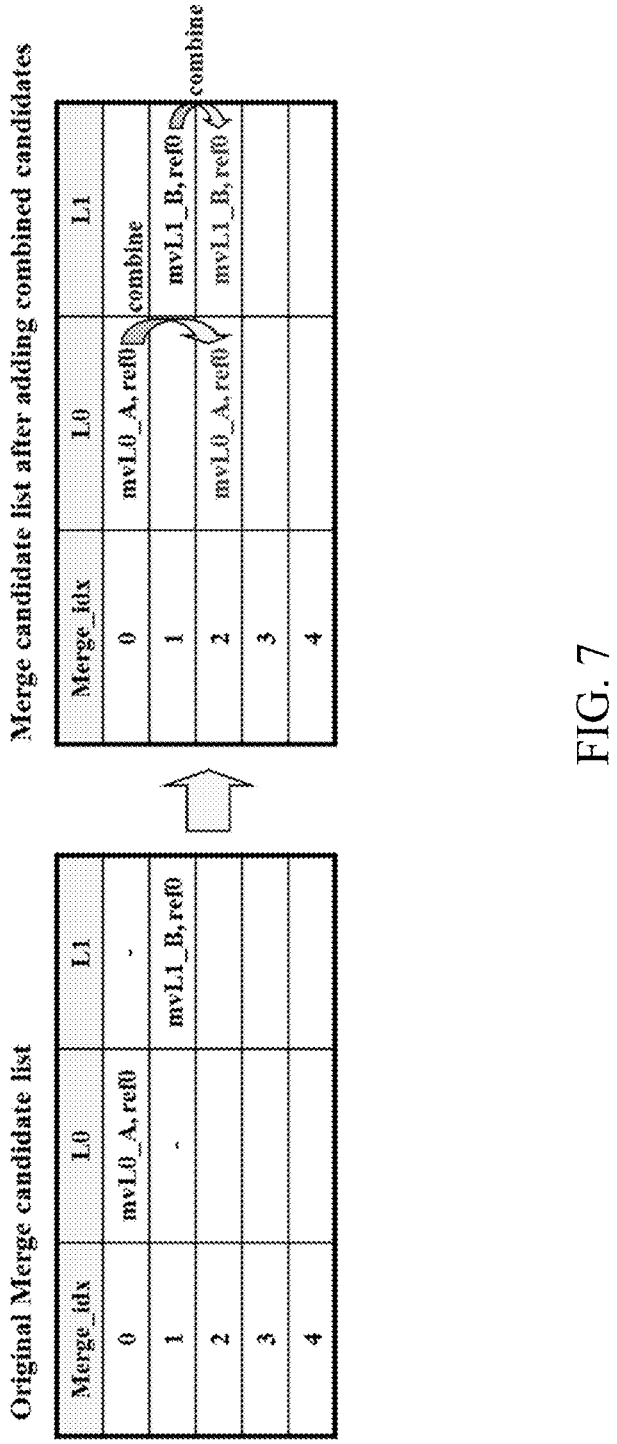
FIG. 7 shows an example of a combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion estimation regions for parallel processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1 Derivation of AMVP Candidates

Figure 8:
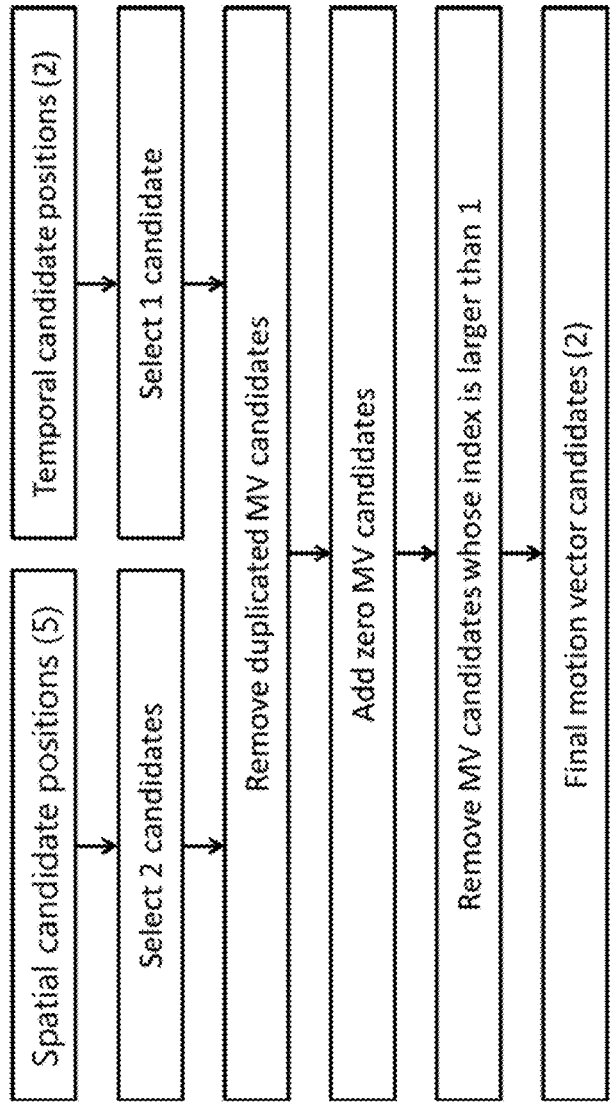
FIG. 8 shows an example of a derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

Figure 2:
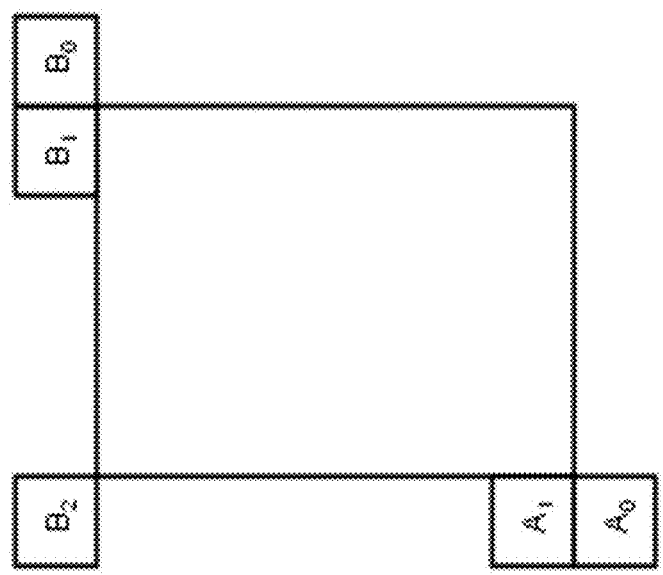
FIG. 2 shows an example of positions of spatial merge candidates.

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as A0, A1, and scaled A0, scaled A1. The order of derivation for the above side of the current PU is defined as B0, B1, B2, scaled B0, scaled B1, scaled B2. For each side there are therefore four cases that can be used as motion vector candidate, with two cases not required to use spatial scaling, and two cases where spatial scaling is used. The four different cases are summarized as follows.

No Spatial Scaling
(1) Same reference picture list, and same reference picture index (same POC)
(2) Different reference picture list, but same reference picture (same POC)

Spatial Scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
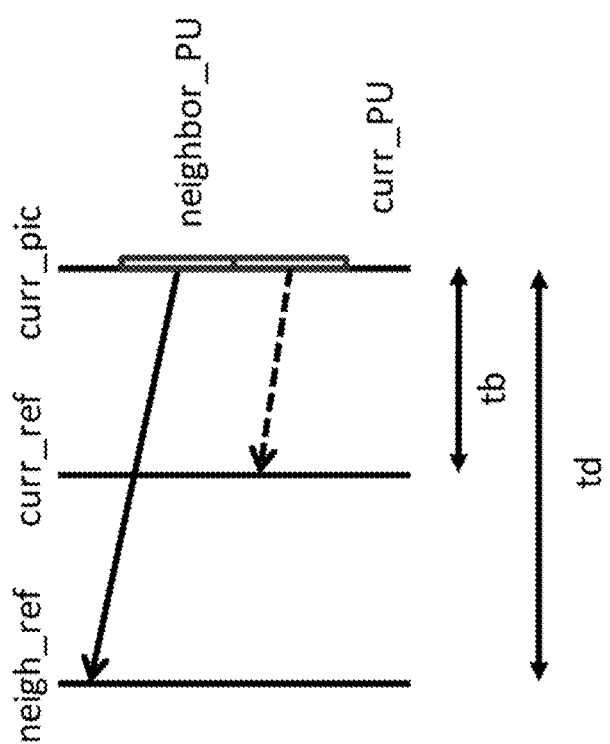
FIG. 9 shows an example of motion vector scaling for a spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 New Inter Prediction Methods

2.2.1 Sub-CU Based Motion Vector Prediction

In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

Figure 10:
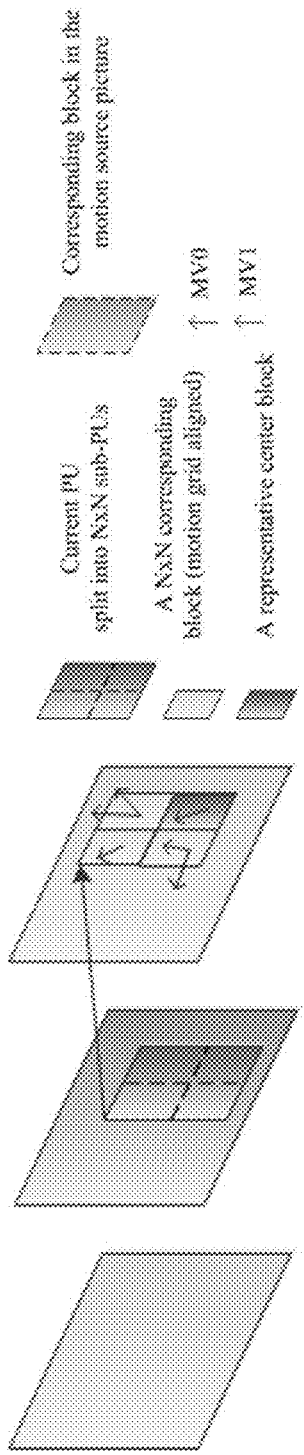
FIG. 10 shows an example of alternative temporal motion vector prediction (ATMVP) for a coding unit (CU).

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector MVx (the motion vector corresponding to reference picture list X) to predict motion vector MVy (with X being equal to 0 or 1 and Y being equal to 1−X) for each sub-CU.

2.2.2 Pairwise Average Candidates

Pairwise average candidates are generated by averaging predefined pairs of candidates in the current merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when they point to different reference pictures; if only one motion vector is available, use the one directly; if no motion vector is available, keep this list invalid. The pairwise average candidates replace the combined candidates in HEVC standard.

The complexity analysis of pairwise average candidates is summarized in the Table 1. For the worst case of additional calculations for averaging (the last column in Table 1), 4 additions and 4 shifts are needed for each pair (MVx and MVy in L0 and L1), and 4 reference index comparisons are needed for each pair (refIdx0 is valid and refIdx1 is valid in L0 and L1). There are 6 pairs, leading to 24 additions, 24 shifts, and 24 reference index comparisons in total. The combined candidates in HEVC standard use 2 reference index comparisons for each pair (refIdx0 is valid in L0 and refIdx1 is valid in L1), and there are 12 pairs, leading to 24 reference index comparisons in total.

2.2.3 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 11:
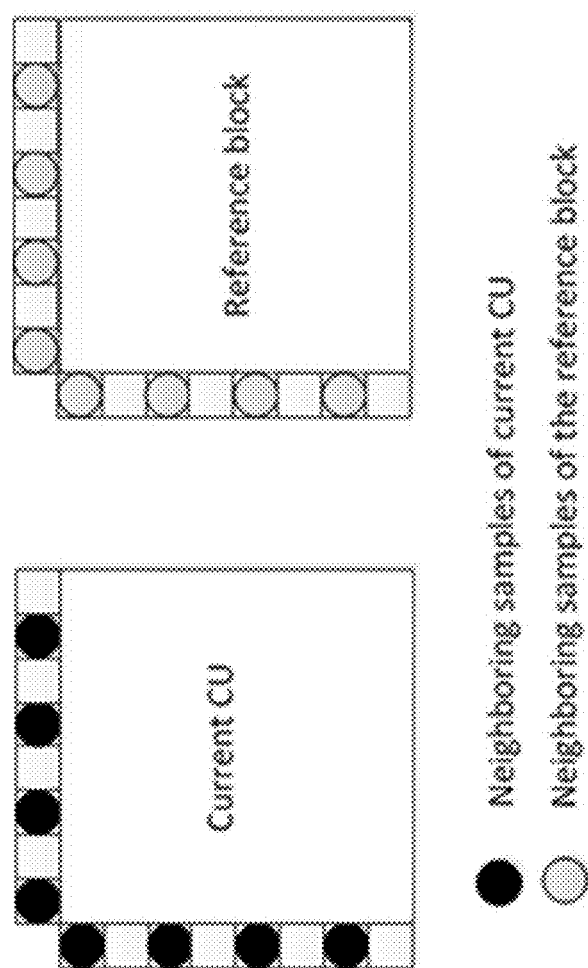
FIG. 11 shows an example of neighboring samples used for deriving IC parameters.
Figure 12:
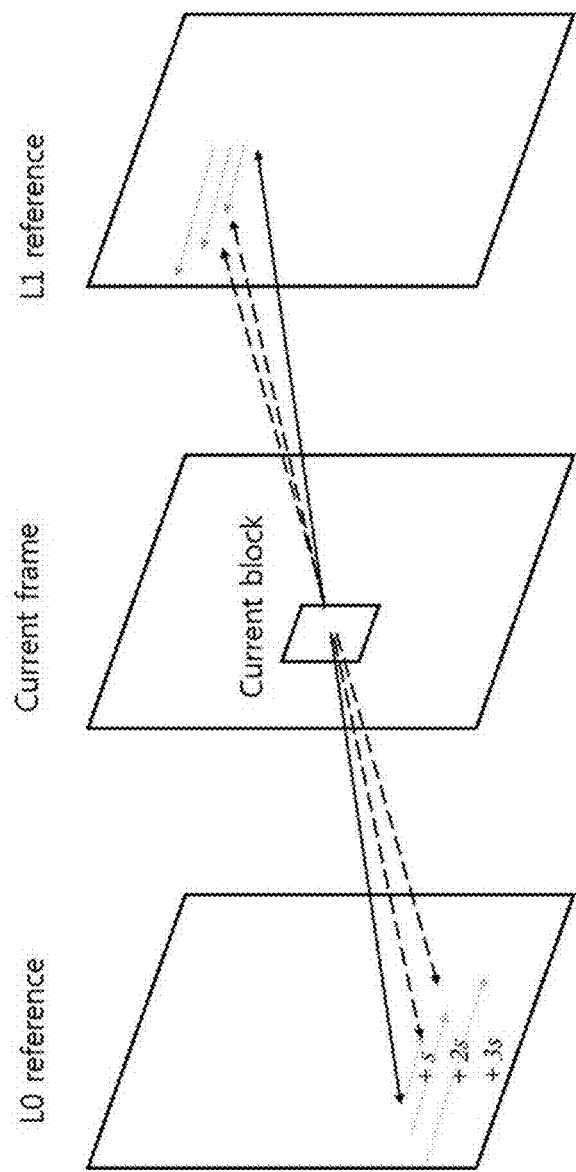
FIG. 12 shows an example of an ultimate motion vector expression (UMVE) search process.

When LIC applies for a CU, a least square error method is employed to derive the parameters a and b by using the neighbouring samples of the current CU and their corresponding reference samples. More specifically, as illustrated in FIG. 11, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.4 Combined Intra and Inter Prediction

In some embodiments, multi-hypothesis prediction is proposed, wherein combined intra and inter prediction is one way to generate multiple hypotheses.

When the multi-hypothesis prediction is applied to improve intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU

TABLE 1

Operation analysis for the pairwise average candidates

| Merge list size | Max number of potential candidates | Max number of candidate comparisons | Max number of MV scalings | Max number of temporal candidates | Additional local buffer | Max number of memory access | Others |
|---|---|---|---|---|---|---|---|
| 6, 8, 10 | 6 | 0 | 0 | 0 | 0 | 0 | Replace HEVC combined candidates, need additional calculations for averaging | height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected, or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

Generalized Bi-Prediction

In conventional bi-prediction, the predictors from L0 and L1 are averaged to generate the final predictor using the equal weight 0.5. The predictor generation formula is shown as in Equ. (3)

$$P_{TraditionalBiPred}=(P_{L0}+P_{L1}+\text{RoundingOffset})\text{>>shiftNum}, \quad (1)$$

In Equ. (3), PTraditionalBiPred is the final predictor for the conventional bi-prediction, PL0 and PL1 are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Equ. (4).

$$P_{GBi}=((1-w_1)*P_{L0}+w_1*P_{L1}+\text{RoundingOffset}_{GBi})\text{>>shiftNum}_{GBi}, \quad (2)$$

In Equ. (4), PGBi is the final predictor of GBi. (1−w1) and w1 are the selected GBI weights applied to the predictors of L0 and L1, respectively. RoundingOffsetGBi and shiftNumGBi are used to normalize the final predictor in GBi.

The supported w1 weight table is {−1/4, 3/8, 1/2, 5/8, 5/4}. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.2.6 Ultimate Motion Vector Expression

In some embodiments, ultimate motion vector expression (UMVE) is presented. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | ¼-pel | ½-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flage is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.2.7 History Based Motion Vector Prediction

In our previous invention P1805028401H, one or more look up tables with at least one motion candidate stored to predict motion information of a block.

Figure 13:
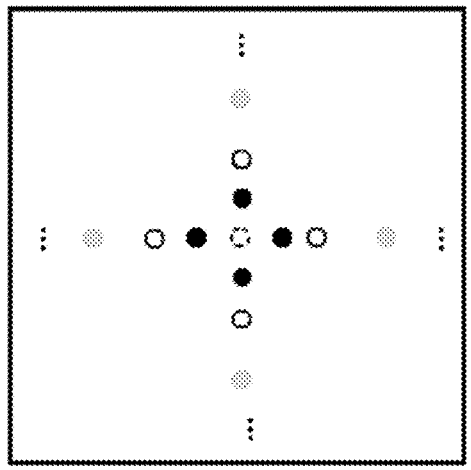
FIG. 13 shows an example of an UMVE search point.
Figure 13:
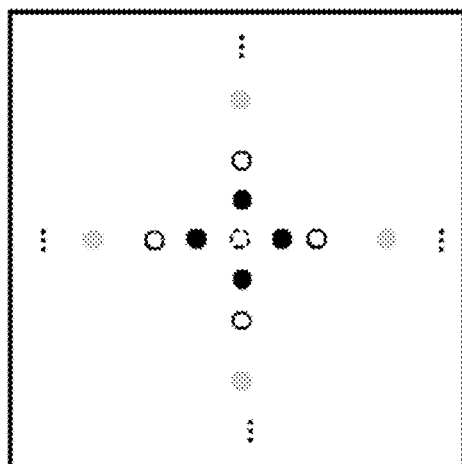

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. The overall coding flow is depicted in FIG. 13.

In one example, the table size is set to be L (e.g., L=16 or 6, or 44), which indicates up to L HMVP candidates may be added to the table.

Figure 14:
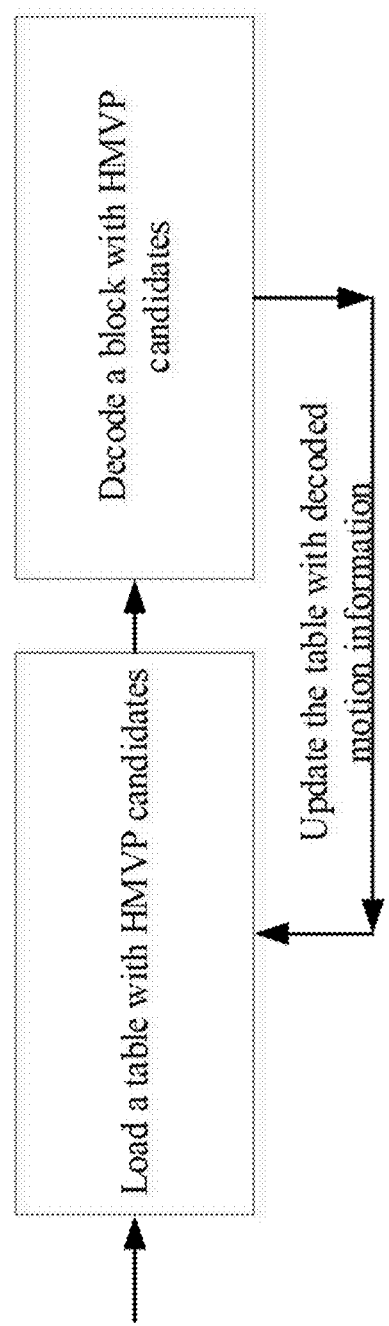
FIG. 14 shows an example of a decoding flow chart with a proposed HMVP method.
Figure 15:
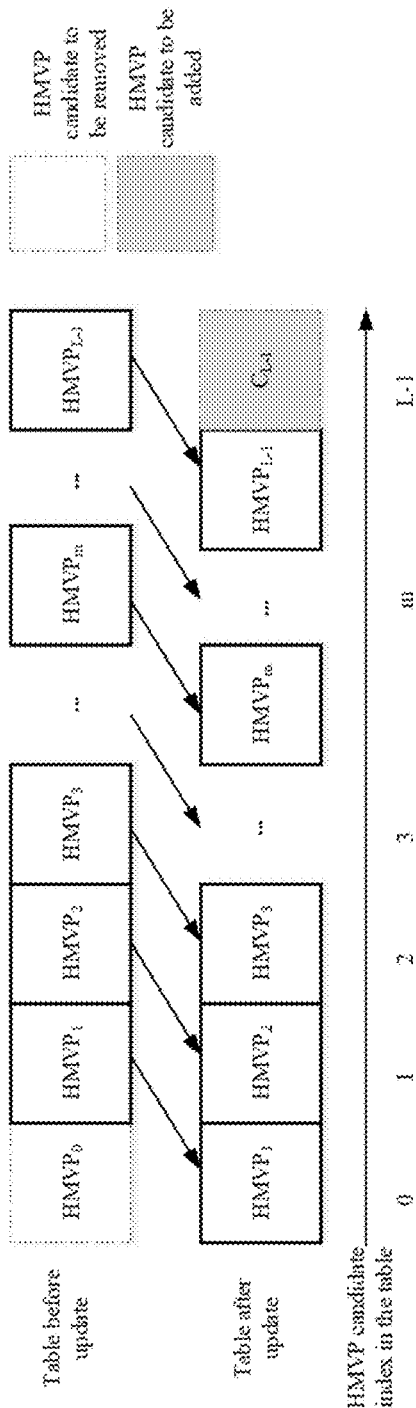
FIG. 15 shows an example of updating the table in the proposed HMVP method.

In one embodiment, if there are more than L HMVP candidates from the previously coded blocks, a First-In-First-Out (FIFO) rule is applied so that the table always contains the latest previously coded L motion candidates. FIG. 14 depicts an example wherein the FIFO rule is applied to remove a HMVP candidate and add a new one to the table used in the proposed method.

In another embodiment, whenever adding a new motion candidate (such as the current block is inter-coded and non-affine mode), a redundancy checking process is applied firstly to identify whether there are identical or similar motion candidates in LUTs.

2.2.8 Symmetric Motion Vector Difference

In some embodiments, symmetric motion vector difference (SMVD) is proposed to encode the MVD more efficiently.

Firstly, in slice level, variables BiDirPredFlag, RefIdxSymL0 and RefIdxSymL1 are derived as follows:

The forward reference picture in reference picture list 0 which is nearest to the current picture is searched. If found, RefIdxSymL0 is set equal to the reference index of the forward picture.

The backward reference picture in reference picture list 1 which is nearest to the current picture is searched. If found, RefIdxSymL1 is set equal to the reference index of the backward picture.

If both forward and backward picture are found, BiDirPredFlag is set equal to 1.

Otherwise, following applies:

The backward reference picture in reference picture list 0 which is nearest to the current one is searched. If found, RefIdxSymL0 is set equal to the reference index of the backward picture.

The forward reference picture in reference picture list 1 which is nearest to the current one is searched. If found, RefIdxSymL1 is set equal to the reference index of the forward picture.

If both backward and forward picture are found, BiDirPredFlag is set equal to 1. Otherwise, BiDirPredFlag is set equal to 0.

Secondly, in CU level, a symmetrical mode flag indicating whether symmetrical mode is used or not is explicitly signaled if the prediction direction for the CU is bi-prediction and BiDirPredFlag is equal to 1.

When the flag is true, only mvp_l0_flag, mvp_l1_flag and MVD0 are explicitly signaled. The reference indices are set equal to RefIdxSymL0, RefIdxSymL1 for list 0 and list 1, respectively. MVD1 is just set equal to −MVD0. The final motion vectors are shown in below formula.

$$\begin{cases} (mvx_0, mvy_0) = (mvpx_0 + mvdx_0, mvpy_0 + mvdy_0) \\ (mvx_1, mvy_1) = (mvpx_1 - mvdx_0, mvpy_1 - mvdy_0) \end{cases}$$

The modifications in coding unit syntax are shown in Table 2.

Table 2: Modifications in coding unit syntax

| | Descriptor |
|---|---|
| coding_unit( x0, y0, cbWidth, cbHeight, treeType ) { | |
| ... | |
|     if( slice_type = = B ) | |
|       inter_pred_idc[ x0 ][ y0 ] | ae(v) |
|     if( sps_affine_enabled_flag && cbWidth >= 16 && cbHeight >= 16 ) { | |
|       inter_affine_flag[ x0 ][ y0 ] | ae(v) |
|       if( sps_affine_type_flag && inter_affine_flag[ x0 ][ y0 ] ) | |
|         cu_affine_type_flag[ x0 ][ y0 ] | ae(v) |
|     } | |
|     if( inter_pred_idc[ x0 ][ y0 ] == PRED_BI && | |
|       BiDirPredFlag && inter_affine_flag[ x0 ][ y0 ] == 0 ) | |
|       symmetric_mvd_flag[ x0 ][ y0 ] | ae(v) |
|     if( inter_pred_idc[ x0 ][ y0 ] != PRED_L1 ) { | |
|       if( num_ref_idx_l0_active_minus1 > 0 && !symmetric_mvd_flag[ x0 ][ y0 ] ) | |
|         ref_idx_l0[ x0 ][ y0 ] | ae(v) |
|       mvd_coding( x0, y0, 0, 0 ) | |
|       if( MotionModelIdc[ x0 ][ y0 ] > 0 ) | |
|         mvd_coding( x0, y0, 0, 1 ) | |
|       if(MotionModelIdc[ x0 ][ y0 ] > 1 ) | |
|         mvd_coding( x0, y0, 0, 2 ) | |
|       mvp_l0_flag[ x0 ][ y0 ] | ae(v) |
|     } else { | |
|       MvdL0[ x0 ][ y0 ][ 0 ] = 0 | |
|       MvdL0[ x0 ][ y0 ][ 1 ] = 0 | |
|     } | |
|     if( inter_pred_idc[ x0 ][ y0 ] != PRED_L0 ) { | |
|       if( num_ref_idx_l1_active_minus1 > 0 && !symmetric_mvd_flag[ x0 ][ y0 ] ) | |
|         ref_idx_l1[ x0 ][ y0 ] | ae(v) |
|       if( mvd_l1_zero_flag && inter_pred_idc[ x0 ][ y0 ] = = PRED_BI ) { | |
|         ... | |
|       } else { | |

| | Descriptor |
|---|---|
| ``````if( !symmetric_mvd_flag[ x0 ][ y0 ] ) {
    mvd_coding( x0, y0, 1, 0 )
    if( MotionModelIdc[ x0 ][ y0 ] > 0 )
        mvd_coding( x0, y0, 1, 1 )
    if(MotionModelIdc[ x0 ][ y0 ] > 1 )
        mvd_coding( x0, y0, 1, 2 )
}
        mvp_l1_flag[ x0 ][ y0 ]
    } else {
        MvdL1[ x0 ][ y0 ][ 0 ] = 0
        MvdL1[ x0 ][ y0 ][ 1 ] = 0
    }
    ...
    }
}
...
}`````` | ae(v) |

2.2.9 CIIP in VTM4

In VTM4, when a CU is coded in merge mode, and if the CU contains at least 64 luma samples (that is, CU width times CU height is equal to or larger than 64), an additional flag is signalled to indicate if the combined inter/intra prediction (CIIP) mode is applied to the current CU.

In order to form the CIIP prediction, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction.

1. Intra Prediction Mode Derivation

Up to 4 intra prediction modes, including DC, PLANAR, HORIZONTAL, and VERTICAL modes, can be used to predict the luma component in the CIIP mode. If the CU shape is very wide (that is, width is more than two times of height), then the HORIZONTAL mode is not allowed. If the CU shape is very narrow (that is, height is more than two times of width), then the VERTICAL mode is not allowed. In these cases, only 3 intra prediction modes are allowed.

The CIIP mode uses 3 most probable modes (MPM) for intra prediction. The CIIP MPM candidate list is formed as follows:

The left and top neighbouring blocks are set as A and B, respectively

The intra prediction modes of block A and block B, denoted as intraModeA and intraModeB, respectively, are derived as follows:

Let X be either A or B intraModeX is set to DC if 1) block X is not available; or 2) block X is not predicted using the CIIP mode or the intra mode; 3) block B is outside of the current CTU otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34)

If intraModeA and intraModeB are the same:

If intraModeA is PLANAR or DC, then the three MPMs are set to {PLANAR, DC, VERTICAL} in that order Otherwise, the three MPMs are set to {intraModeA, PLANAR, DC} in that order Otherwise (intraModeA and intraModeB are different):

The first two MPMs are set to {intraModeA, intraModeB} in that order

Uniqueness of PLANAR, DC and VERTICAL is checked in that order against the first two MPM candidate modes; as soon as a unique mode is found, it is added to as the third MPM If the CU shape is very wide or very narrow as defined above, the MPM flag is inferred to be 1 without signalling. Otherwise, an MPM flag is signalled to indicate if the CIIP intra prediction mode is one of the CIIP MPM candidate modes.

If the MPM flag is 1, an MPM index is further signalled to indicate which one of the MPM candidate modes is used in CIIP intra prediction. Otherwise, if the MPM flag is 0, the intra prediction mode is set to the "missing" mode in the MPM candidate list. For example, if the PLANAR mode is not in the MPM candidate list, then PLANAR is the missing mode, and the intra prediction mode is set to PLANAR. Since 4 possible intra prediction modes are allowed in CIIP, and the MPM candidate list contains only 3 intra prediction modes, one of the 4 possible modes must be the missing mode.

For the chroma components, the DM mode is always applied without additional signalling; that is, chroma uses the same prediction mode as luma.

The intra prediction mode of a CIIP-coded CU will be saved and used in the intra mode coding of the future neighbouring CUs.

2.2.9.2 Combining the Inter and Intra Prediction Signals

The inter prediction signal in the CIIP mode $P_{inter}$ is derived using the same inter prediction process applied to regular merge mode; and the intra prediction signal $P_{intra}$ is derived using the CIIP intra prediction mode following the regular intra prediction process. Then, the intra and inter prediction signals are combined using weighted averaging, where the weight value depends on the intra prediction mode and where the sample is located in the coding block, as follows:

If the intra prediction mode is the DC or planar mode, or if the block width or height is smaller than 4, then equal weights are applied to the intra prediction and the inter prediction signals.

Otherwise, the weights are determined based on the intra prediction mode (either horizontal mode or vertical mode in this case) and the sample location in the block. Take the horizontal prediction mode for example (the weights for the vertical mode are derived similarly but in the orthogonal direction). Denote W as the width of the block and H as the height of the block. The coding block is first split into four equal-area parts, each of the dimension (W/4)×H. Starting from the part closest to the intra prediction reference samples and ending at the part farthest away from the intra prediction reference samples, the weight wt for each of the 4 regions is set to 6, 5, 3, and 2, respectively. The final CIIP prediction signal is derived using the following:

$$P_{CIIP}=((8-wt)*P_{inter}+wt*P_{intra}+4)>>3$$

ii. CIIP in VTM5

In VTM5, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value is calculated depending on the coding modes of the top and left neighbouring blocks (depicted in FIG. 16) as follows:

If the top neighbor is available and intra coded, then set isIntraTop to 1, otherwise set isIntraTop to 0;

If the left neighbor is available and intra coded, then set isIntraLeft to 1, otherwise set isIntraLeft to 0;

If (isIntraLeft+isIntraTop) is equal to 2, then wt is set to 3;

Otherwise, if (isIntraLeft+isIntraTop) is equal to 1, then wt is set to 2;

Otherwise, set wt to 1.

The CIIP prediction is formed as follows:

$$P_{CIIP}=((4-wt)*P_{inter}+wt*P_{intra}+2)>>2$$

Figure 16:
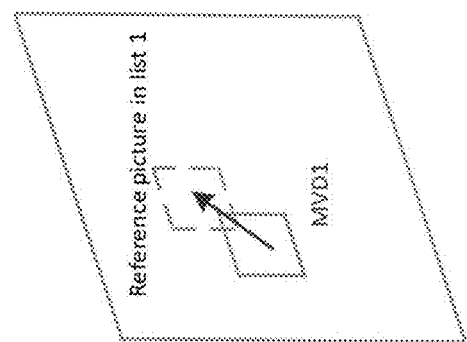
FIG. 16 shows an example of symmetrical mode.
Figure 16:
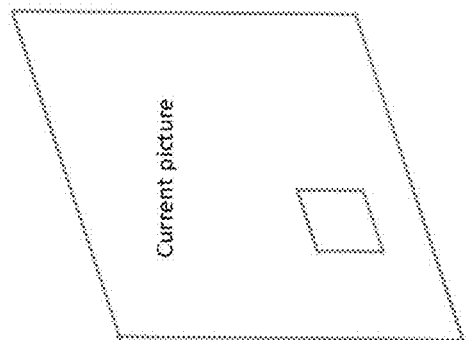
Figure 16:
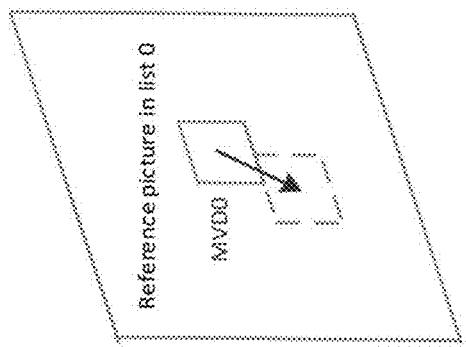

FIG. 16 shows Top and left neighboring blocks used in CIIP weight derivation

2.3. Intra Mode Derivation Process

In current VTM-4.0, when coding one intra-coded block, one most-probable-mode (MPM) flag is firstly signaled. If the MPM flag is true, then the index to a MPM list is further signaled. Otherwise, the index of non-MPM modes is signaled.

Related syntax elements, symmetric and decoding process in the latest VVC specification (JVET-M1001_v7) are provided as follows:

Related Syntax

Coding Unit Syntax

|  | Descriptor |
|---|---|
| coding_unit( x0, y0, cbWidth, cbHeight, treeType ) { | |
|   if( tile_group_type != I \|\| sps_ibc_enabled_flag ) { | |
|     if( treeType != DUAL_TREE_CHROMA ) | |
|       cu_skip_flag[ x0 ][ y0 ] | ae(v) |
|     if( cu_skip_flag[ x0 ][ y0 ] = = 0 && tile_group_type != I ) | |
|       pred_mode_flag | ae(v) |
|     if( ( ( tile_group_type = = I && cu_skip_flag[ x0 ][ y0 ] = =0 ) \|\| | |
|       ( tile_group_type != I && CuPredMode[ x0 ][ y0 ] != MODE_INTRA ) ) && | |
|       sps_ibc_enabled_flag ) | |
|       pred_mode_ibc_flag | ae(v) |
|   } | |
|   if( CuPredMode[ x0 ][ y0 ] = = MODE_INTRA ) { | |
|     if( sps_pcm_enabled_flag && | |
|       cbWidth >= MinIpcmCbSizeY && cbWidth <= MaxIpcmCbSizeY && | |
|       cbHeight >= MinIpcmCbSizeY && cbHeight <= MaxIpcmCbSizeY ) | |
|       pcm_flag[ x0 ][ y0 ] | ae(v) |
|     if( pcm_flag[ x0 ][ y0 ] ) { | |
|       while( !byte_aligned( ) ) | |
|         pcm_alignment_zero_bit | f(1) |
|       pcm_sample( cbWidth, cbHeight, treeType) | |
|     } else { | |
|       if( treeType = = SINGLE_TREE \|\| treeType = = DUAL_TREE_LUMA ) { | |
|         if( ( y0% CtbSizeY ) > 0 ) | |
|           intra_luma_ref_idx[ x0 ][ y0 ] | ae(v) |
|         if (intra_luma_ref_idx[ x0 ][ y0 ] = = 0 && | |
|           ( cbWidth <= MaxTbSizeY \|\| cbHeight <= MaxTbSizeY ) && | |
|           ( cbWidth * cbHeight > MinTbSizeY * MinTbSizeY )) | |
|           intra_subpartitions_mode_flag[ x0 ][ y0 ] | ae(v) |
|         if( intra_subpartitions_mode_flag[ x0 ][ y0 ] = = 1 && | |
|           cbWidth <= MaxTbSizeY && cbHeight <= MaxTbSizeY ) | |
|           intra_subpartitions_split_flag[ x0 ][ y0 ] | ae(v) |
|         if( intra_luma_ref_idx[ x0 ][ y0 ] = = 0 && | |
|           intra_subpartitions_mode_flag[ x0 ][ y0 ] = = 0 ) | |
|           intra_luma_mpm_flag[ x0 ][ y0 ] | ae(v) |
|         if( intra_luma_mpm_flag[ x0 ][ y0 ] ) | |
|           intra_luma_mpm_idx[ x0 ][ y0 ] | ae(v) |
|         else | |
|           intra_luma_mpm_remainder[ x0 ][ y0 ] | ae(v) |
|       } | |
|       if( treeType = = SINGLE_TREE \|\| treeType = = DUAL_TREE_CHROMA ) | |

-continued

| | Descriptor |
|---|---|
| intra_chroma_pred_mode[ x0 ][ y0 ]<br>}<br>} else if( treeType != DUAL_TREE_CHROMA ) { /* MODE_INTER or MODE_IBC */<br>...<br>} | ae(v) |

Semantics

The syntax elements intra_luma_mpm_flag[x0][y0], intra_luma_mpm_idx[x0][y0] and intra_luma_mpm_remainder[x0][y0] specify the intra prediction mode for luma samples. The array indices x0, y0 specify the location (x0, y0) of the top-left luma sample of the considered coding block relative to the top-left luma sample of the picture. When intra_luma_mpm_flag[x0][y0] is equal to 1, the intra prediction mode is inferred from a neighbouring intra-predicted coding unit according to clause 8.4.2.

When intra_luma_mpm_flag[x0][y0] is not present, it is inferred to be equal to 1.

Decoding Process

Derivation Process for Luma Intra Prediction Mode

Input to this Process are:

a luma location (xCb, yCb) specifying the top-left sample of the current luma coding block relative to the top-left luma sample of the current picture, a variable cbWidth specifying the width of the current coding block in luma samples, a variable cbHeight specifying the height of the current coding block in luma samples.

In this process, the luma intra prediction mode IntraPredModeY[xCb][yCb] is derived.

Table 8-1 specifies the value for the intra prediction mode IntraPredModeY[xCb][yCb] and the associated names.

TABLE 8-1

Specification of intra prediction mode and associated names

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

NOTE—: The intra prediction modes INTRA_LT_CCLM, INTRA_L_CCLM and INTRA_T_CCLM are only applicable to chroma components.

IntraPredModeY[xCb][yCb] is derived by the following ordered steps:

1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:

The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.

The candidate intra prediction mode candIntraPredModeX is derived as follows:
   If one or more of the following conditions are true, candIntraPredModeX is set equal to INTRA_PLANAR.
   The variable availableX is equal to FALSE.
   CuPredMode[xNbX][yNbX] is not equal to MODE_INTRA and ciip_flag[xNbX][yNbX] is not equal to 1.
   pcm_flag[xNbX][yNbX] is equal to 1.
   X is equal to B and yCb−1 is less than ((yCb>>CtbLog2SizeY)<<CtbLog2SizeY).
   Otherwise, candIntraPredModeX is set equal to IntraPredModeY[xNbX][yNbX].
3. The variables ispDefaultMode1 and ispDefaultMode2 are defined as follows:
   If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
   Otherwise, ispDefaultMode1 is set equal to INTRA_ANGULAR50 and ispDefaultMode2 is set equal to INTRA_ANGULAR63.
4. The candModeList[x] with x=0 ... 5 is derived as follows:
   If candIntraPredModeB is equal to candIntraPredModeA and candIntraPredModeA is greater than INTRA_DC, candModeList[x] with x=0 ... 5 is derived as follows:
   If IntraLumaRefLineIdx[xCb][yCb] is equal to 0 and IntraSubPartitionsSplitType is equal to ISP_NO_SPLIT, the following applies:

$$candModeList[0]=candIntraPredModeA \qquad (8\text{-}9)$$

$$candModeList[1]=INTRA\_PLANAR \qquad (8\text{-}10)$$

$$candModeList[2]=INTRA\_DC \qquad (8\text{-}11)$$

$$candModeList[3]=2+((candIntraPredModeA+61)\%64) \qquad (8\text{-}12)$$

$$candModeList[4]=2+((candIntraPredModeA-1)\%64) \qquad (8\text{-}13)$$

$$candModeList[5]=2+((candIntraPredModeA+60)\%64) \qquad (8\text{-}14)$$

Otherwise (IntraLumaRefLineIdx[xCb][yCb] is not equal to 0 or IntraSubPartitionsSplitType is not equal to ISP_NO_SPLIT), the following applies:

$$candModeList[0]=candIntraPredModeA \qquad (8\text{-}15)$$

$$candModeList[1]=2+((candIntraPredModeA+61)\%64) \qquad (8\text{-}16)$$

$$candModeList[2]=2+((candIntraPredModeA-1)\%64) \qquad (8\text{-}17)$$

If one of the following conditions is true, IntraSubPartitionsSplitType is equal to ISP_HOR_SPLIT and candIntraPredModeA is less than INTRA_ANGULAR34, IntraSubPartitionsSplitType is equal to ISP_VER_SPLIT and candIntraPredModeA is greater than or equal to INTRA_ANGULAR34, IntraLumaRefLineIdx[xCb][yCb] is not equal to 0, the following applies:

candModeList[3]=2+((candIntraPredModeA+60)%64)  (8-18)

candModeList[4]=2+(candIntraPredModeA%64)  (8-19)

candModeList[5]=2+((candIntraPredModeA+59)%64)  (8-20)

Otherwise, the following applies:

candModeList[3]=ispDefaultMode1  (8-21)

candModeList[4]=ispDefaultMode2  (8-22)

candModeList[5]=INTRA_PLANAR  (8-23)

Otherwise if candIntraPredModeB is not equal to candIntraPredModeA and candIntraPredModeA or candIntraPredModeB is greater than INTRA_DC, the following applies:
The variables minAB and maxAB are derived as follows:

minAB=Min(candIntraPredModeA,candIntraPredModeB)  (8-24)

maxAB=Max(candIntraPredModeA,candIntraPredModeB)  (8-25)

If candIntraPredModeA and candIntraPredModeB are both greater than INTRA_DC, candModeList[x] with x=0 . . . 5 is derived as follows:

candModeList[0]=candIntraPredModeA  (8-26)

candModeList[1]=candIntraPredModeB  (8-27)

If IntraLumaRefLineIdx[xCb][yCb] is equal to 0 and IntraSubPartitionsSplitType is equal to ISP_NO_SPLIT, the following applies:

candModeList[2]=INTRA_PLANAR  (8-28)

candModeList[3]=INTRA_DC  (8-29)

If maxAB−minAB is in the range of 2 to 62, inclusive, the following applies:

candModeList[4]=2+((maxAB+61)%64)  (8-30)

candModeList[5]=2+((maxAB−1)%64)  (8-31)

Otherwise, the following applies:

candModeList[4]=2+((maxAB+60)%64)  (8-32)

candModeList[5]=2+((maxAB)%64)  (8-33)

Otherwise (IntraLumaRefLineIdx[xCb][yCb] is not equal to 0 or IntraSubPartitionsSplitType is not equal to ISP_NO_SPLIT), the following applies:
When IntraSubPartitionsSplitType is not equal to ISP_NO_SPLIT, and abs(candIntraPredModeB−ispDefaultMode1) is less than abs(candIntraPredModeA−ispDefaultMode1), the following applies:

candModeList[0]=candIntraPredModeB  (8-34)

candModeList[1]=candIntraPredModeA  (8-35)

If maxAB−minAB is equal to 1, the following applies:

candModeList[2]=2+((minAB+61)%64)  (8-36)

candModeList[3]=2+((maxAB−1)%64)  (8-37)

candModeList[4]=2+((minAB+60)%64)  (8-38)

candModeList[5]=2+(maxAB%64)  (8-39)

Otherwise if maxAB−minAB is equal to 2, the following applies:

candModeList[2]=2+((minAB−1)%64)  (8-40)

candModeList[3]=2+((minAB+61)%64)  (8-41)

candModeList[4]=2+((maxAB−1)%64)  (8-42)

candModeList[5]=2+((minAB+60)%64)  (8-43)

Otherwise if maxAB−minAB is greater than 61, the following applies:

candModeList[2]=2+((minAB−1)%64)  (8-44)

candModeList[3]=2+((maxAB+61)%64)  (8-45)

candModeList[4]=2+(minAB%64)  (8-46)

candModeList[5]=2+((maxAB+60)%64)  (8-47)

Otherwise, the following applies:

candModeList[2]=2+((minAB+61)%64)  (8-48)

candModeList[3]=2+((minAB−1)%64)  (8-49)

candModeList[4]=2+((maxAB+61)%64)  (8-50)

candModeList[5]=2+((maxAB−1)%64)  (8-51)

Otherwise (candIntraPredModeA or candIntraPredModeB is greater than INTRA_DC), candModeList[x] with x=0 . . . 5 is derived as follows:
If IntraLumaRefLineIdx[xCb][yCb] is equal to 0 and IntraSubPartitionsSplitType is equal to ISP_NO_SPLIT, the following applies:

candModeList[0]=candIntraPredModeA  (8-52)

candModeList[1]=candIntraPredModeB  (8-53)

candModeList[2]=1−minAB  (8-54)

candModeList[3]=2+((maxAB+61)%64)  (8-55)

candModeList[4]=2+((maxAB−1)%64)  (8-56)

candModeList[5]=2+((maxAB+60)%64)  (8-57)

Otherwise, if IntraLumaRefLineIdx[xCb][yCb] is not equal to 0, the following applies:

candModeList[0]=maxAB  (8-58)

candModeList[1]=2+((maxAB+61)%64)  (8-59)

candModeList[2]=2+((maxAB−1)%64)  (8-60)

candModeList[3]=2+((maxAB+60)%64)  (8-61)

candModeList[4]=2+(maxAB%64)  (8-62)

candModeList[5]=2+((maxAB+59)%64)  (8-63)

Otherwise (IntraSubPartitionsSplitType is not equal to ISP_NO_SPLIT), the following applies:

candModeList[0]=INTRA_PLANAR (8-64)

candModeList[1]=maxAB (8-65)

candModeList[2]=2+((maxAB+61)%64) (8-66)

candModeList[3]=2+((maxAB−1)%64) (8-67)

candModeList[4]=2+((maxAB+60)%64) (8-68)

candModeList[5]=2+(maxAB%64) (8-69)

Otherwise, the following applies:
If IntraLumaRefLineIdx[xCb][yCb] is equal to 0 and IntraSubPartitionsSplitType is equal to ISP_NO_SPLIT, the following applies:

candModeList[0]=candIntraPredModeA (8-70)

candModeList[1]=(candModeList[0]==INTRA_PLANAR)?INTRA_DC:INTRA_PLANAR (8-71)

candModeList[2]=INTRA_ANGULAR50 (8-72)

candModeList[3]=INTRA_ANGULAR18 (8-73)

candModeList[4]=INTRA_ANGULAR46 (8-74)

candModeList[5]=INTRA_ANGULAR54 (8-75)

Otherwise, if IntraLumaRefLineIdx[xCb][yCb] is not equal to 0, the following applies:

candModeList[0]=INTRA_ANGULAR50 (8-76)

candModeList[1]=INTRA_ANGULAR18 (8-77)

candModeList[2]=INTRA_ANGULAR2 (8-78)

candModeList[3]=INTRA_ANGULAR34 (8-79)

candModeList[4]=INTRA_ANGULAR66 (8-80)

candModeList[5]=INTRA_ANGULAR26 (8-81)

Otherwise, if IntraSubPartitionsSplitType is equal to ISP_HOR_SPLIT, the following applies:

candModeList[0]=INTRA_PLANAR (8-82)

candModeList[1]=INTRA_ANGULAR18 (8-83)

candModeList[2]=INTRA_ANGULAR25 (8-84)

candModeList[3]=INTRA_ANGULAR10 (8-85)

candModeList[4]=INTRA_ANGULAR65 (8-86)

candModeList[5]=INTRA_ANGULAR50 (8-87)

Otherwise, if IntraSubPartitionsSplitType is equal to ISP_VER_SPLIT, the following applies:

candModeList[0]=INTRA_PLANAR (8-88)

candModeList[1]=INTRA_ANGULAR50 (8-89)

candModeList[2]=INTRA_ANGULAR43 (8-90)

candModeList[3]=INTRA_ANGULAR60 (8-91)

candModeList[4]=INTRA_ANGULAR3 (8-e)

candModeList[5]=INTRA_ANGULAR18 (8-93)

5. IntraPredModeY[xCb][yCb] is derived by applying the following procedure:
If intra_luma_mpm_flag[xCb][yCb] is equal to 1, the IntraPredModeY[xCb II yCb] is set equal to candModeList[intra_luma_mpm_idx[xCb][yCb]].
Otherwise, IntraPredModeY[xCb II yCb] is derived by applying the following ordered steps:
1. When candModeList[i] is greater than candModeList[j] for i=0 ... 4 and for each i, j=(i+1) ... 5, both values are swapped as follows:

(candModeList[i],candModeList[j])=Swap(candModeList[i],candModeList[j]) (8-94)

2. IntraPredModeY[xCb][yCb] is derived by the following ordered steps:
i. IntraPredModeY[xCb][yCb] is set equal to intra_luma_mpm_remainder[xCb][yCb].
ii. For i equal to 0 to 5, inclusive, when IntraPredModeY[xCb][yCb] is greater than or equal to candModeList[i], the value of IntraPredModeY[xCb][yCb] is incremented by one.

The variable IntraPredModeY[x][y] with x=xCb ... xCb+cbWidth−1 and y=yCb ... yCb+cbHeight−1 is set to be equal to IntraPredModeY[xCb][yCb].

3. EXAMPLES OF PROBLEMS SOLVED BY EMBODIMENTS

In LIC, two parameters including scaling parameter and offset b need to be derived by using neighboring reconstructed samples, which may cause latency issue.

The set of allowed weighting factors used in GBI are fixed, which may be inefficient.

CIIP mode is only applied to non-skip merge mode, which may be inefficient.

In current design, CIIP mode flag shall be stored since for the intra mode derivation process of intra coded block and for the intra mode derivation process of CIIP-coded blocks, the neighboring blocks' CIIP mode flag is utilized.

In current design, CIIP weight derivation can be further improved, for example, checking two neighboring blocks and three different weight pairs could be simplified.

In current design, during the CIIP weight derivation process, if a neighboring block is coded with the BDPCM mode, it is treated as intra mode. However, it may be more reasonable to treat it as non-intra mode, since BDPCM is designed for screen content coding.

4. EXAMPLES OF EMBODIMENTS

Hereinafter, a block is used to represent a transform unit (TU)/prediction unit (PU)/coding unit (CU)/a sub-block within one TU/PU/CU etc.

The detailed techniques below should be considered as examples to explain general concepts. These techniques should not be interpreted in a narrow way. Furthermore, these techniques can be combined in any manner.

Suppose (xCb, yCb) is the location of the top-left sample of the current block relative to the top-left sample of the current picture, cbWidth and cbHeight specify the width and height of the current block.

1. CIIP flag or/and LIC flag or/and diffusion filtering flag or/and bilateral filtering flag or/and transform domain filtering flag or/and enabling flag of other kinds of post-reconstruction filter may be constrained to be false (and CIIP or/and LIC or/and diffusion filter or/and bilateral filter or/and transform domain filter may be implicitly disabled), depending on the coded modes of other blocks (such as the adjacent or non-adjacent neighboring blocks and/or the reference blocks).
 a. When one flag is derived to be false, the corresponding method may not be applied.
 b. When one flag is derived to be false, signaling of indications of usage of such modes is skipped.
 c. When one flag is derived to be false, indications of usage of such modes may be still signaled but are constrained to be false in a conformance bitstream, and such modes are not applied.
 d. In one example, whether to apply one or multiple proposed constraints (such as 1.a, 1.b and 1.c) or not may depend on coded modes of all or some of the adjacent and/or non-adjacent neighboring rows or columns.
   i. Alternatively, whether to apply such constraint or not may depend on at least N (N>=1) of the samples in the adjacent or non-adjacent neighboring row or columns which are NOT coded with certain modes.
 e. In one example, the adjacent and/or non-adjacent neighboring rows may include the above row and/or above-right row.
 f. In one example, the neighboring adjacent and/or non-adjacent neighboring columns may include the left column and/or below-left and/or above-left corner.
 g. In one example, certain modes of a block which is not the current block may include intra mode and/or CIIP mode and/or CPR mode.
 h. In one example, if any one of the neighboring/non-adjacent block in the neighboring and/or non-adjacent rows or columns is coded with the certain mode (e.g., intra and/or CIIP mode and/or CPR mode), one or multiple proposed constraints (such as 1.a, 1.b and 1.c) are applied.
 i. In one example, if all neighboring/non-adjacent blocks in the adjacent and/or non-adjacent neighboring rows or columns is coded with the certain mode (e.g., intra and/or CIIP and/or CPR mode), one or multiple proposed constraints are applied.
 j. In one example, if at least N neighboring/non-adjacent block in the neighboring or non-adjacent row or columns is NOT coded with the certain mode (e.g., intra and/or CIIP mode and/or CPR mode), one or multiple proposed constraints (such as 1.a, 1.b and 1.c) are NOT applied.
 k. In one example, whether to apply one or multiple proposed constraints (such as 1.a, 1.b and 1.c) or not may depend on the position of the current block.
   i. In one example, if the current block is on the top of the current CTU (the current block and its above neighbouring block belong to different CTUs), the proposed constraints are not applied.
   ii. In one example, if the current block is on the left of the current CTU (the current block and its left neighbouring block belong to different CTUs), the proposed constraints are not applied.
2. CIIP flag and/or intra mode of CIIP mode may be stored together with motion information in the history-based motion vector prediction (HMVP) table.
 a. In one example, when comparing two candidates' motion information (such as the pruning process), CIIP flag or/and intra mode in CIIP mode are not considered in the comparison.
 b. In one example, when comparing two candidates' motion information, CIIP flag or/and intra mode in CIIP mode are considered in the comparison.
 c. In one example, when a merge candidate is from an entry in the HMVP table, the CIIP flag of that entry is also copied to the merge candidate.
 d. In one example, when a merge candidate is from an entry in the HMVP table, the CIIP flag and the intra mode of that entry are also copied to the merge candidate.
3. CIIP may be performed for AMVP mode (AMVP mode or/and AMVP with SMVD mode)
 a. CIIP flag and/or intra mode in CIIP mode of neighboring/non-adjacent blocks may be inherited in merge mode or/and UMVE (also known as merge with motion vector difference, MMVD for short) mode of current block.
 b. CIIP flag and/or intra mode in CIIP mode may be signaled for non-skip merge mode or/and non-skip UMVE mode, and CIIP flag and/or intra mode in CIIP mode of neighboring/non-adjacent blocks may be inherited in skip merge mode or/and skip UMVE mode.
 c. CIIP flag and/or intra mode in CIIP mode may be signaled for skip merge mode or/and skip UMVE mode, and CIIP flag and/or intra mode in CIIP mode of neighboring/non-adjacent blocks may be inherited in non-skip merge mode or/and non-skip UMVE mode.
 d. In one example, CIIP flag and an intra mode may be signaled for AMVP mode.
 e. In one example, CIIP flag may be inherited in merge mode or/and UMVE mode, and if CIIP flag is true, an intra mode may be further signaled if more than one intra mode are allowed in CIIP.
 f. In one example, CIIP flag and intra mode of neighboring/non-adjacent blocks in merge mode or/and UMVE mode may be inherited by current block.
 g. In one example, CIIP may be disabled for skip mode.
 h. In one example, when comparing two merge candidates, CIIP flag or/and intra mode in CIIP may be not considered in the comparison.
 i. In one example, when comparing two merge candidates, CIIP flag or/and intra mode in CIIP may be considered in the comparison.
4. CIIP may be disabled for pairwise prediction or combined-bi prediction or other kinds of virtual/artificial candidates (e.g., zero motion vector candidates).
 a. Alternatively, if one of the two candidates involved in pairwise prediction or combined-bi prediction adopt CIIP prediction, CIIP may be enabled for the pairwise or combined-bi merge candidate.
   ii. In one example, intra mode of the CIIP mode candidate may be inherited.
   iii. In one example, the intra mode may be explicitly signaled.
 b. Alternatively, if both candidates involved in pairwise prediction or combined-bi prediction adopt CIIP prediction, CIIP may be enabled for the pairwise or combined-bi merge candidate.
   iv. In one example, intra mode of one of two candidates may be inherited.
   v. In one example, an intra mode may be derived from intra modes of the two candidates and is used for the pairwise or combined-bi merge candidate.
   vi. In one example, the intra mode may be explicitly signaled.

Figure 17:
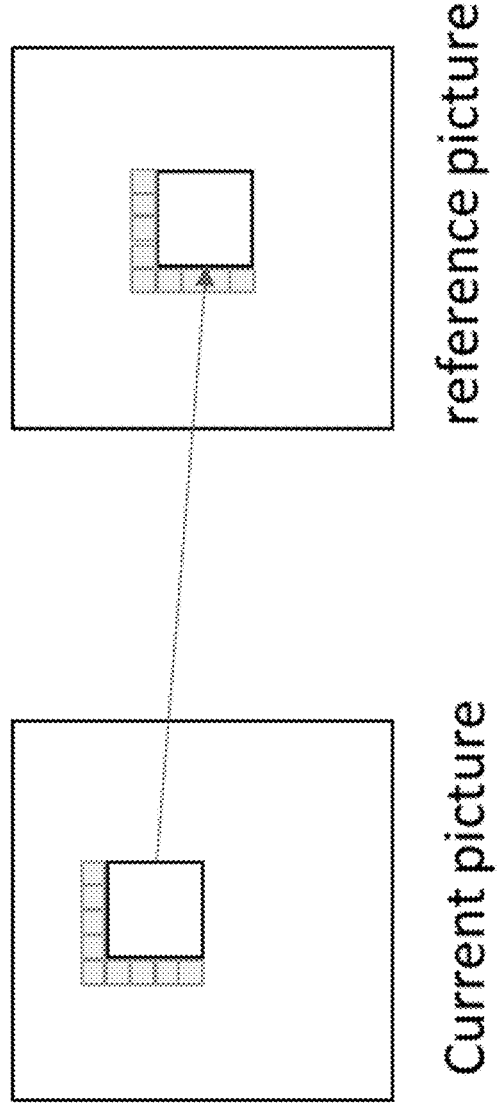
FIG. 17 shows an example of neighboring samples of a current block and their corresponding samples in the reference picture.

5. Neighboring and/or non-adjacent spatially reconstructed samples required in CIIP mode or/and diffusion filter or/and bilateral filter or/and transform domain filter or/and other kinds of post-reconstruction filter may be replaced by the corresponding samples in reference pictures (such as neighboring and/or non-adjacent spatially samples of the reference block, as shown in FIG. 17).
   a. In one example, if the current block is bi-predicted, neighboring samples of the two reference blocks may be averaged to generate the final neighboring samples.
   b. In one example, if the current block is bi-predicted, neighboring samples of one of the two reference blocks may be used as the final neighboring samples.
   c. In one example, if the current block is bi-predicted, neighboring samples of the two reference blocks may be weighted averaged to generate the final neighboring samples if unequal-weight GBI or weighted prediction or LIC is applied to the current block.
   d. In one example, corresponding samples in reference pictures (e.g., neighboring samples of the reference block) may be identified by the motion information of the current block.
   e. In one example, corresponding samples in reference pictures (e.g., neighboring samples of the reference block) may be identified by the modified motion information of the current block. For example, the motion vector may be rounded to integer precision before used for identifying the neighboring samples.
   f. In one example, corresponding samples in reference pictures (e.g., the neighbouring samples of the reference block) are identified via motion vectors in integer-pel precision.
      i. In one example, the MV referring to the reference block is firstly rounded to integer-pixel. The rounded MV is utilized to identify the neighboring samples of the reference block.
      ii. In one example, the proposed replacement is applied when current block is coded with integer-pel motion information. Therefore, no rounding is required.
   g. In one example, the proposed replacement may be applied for certain color component such as luma component only.
      i. Alternatively, the proposed replacement may be applied for all color components.
6. It is proposed to disallow using previously coded CIIP flags for coding following blocks.
   a. In one example, the checking process of CIIP flags from previously coded blocks is skipped to improve the throughput.
   b. In one example, the checking process of CIIP flags from neighboring blocks in the intra mode derivation process is skipped.
      i. In one example, for one neighboring block, if it is coded with CIIP mode, the associated intra mode may be set to a given mode (such as Planar mode). Alternatively, furthermore, the associated intra mode may be used in the MPM list derivation process.
      ii. In one example, for one neighboring block, if it is coded with CIIP mode or normal inter mode, the associated intra mode may be set to a given mode (such as Planar mode). Alternatively, furthermore, the associated intra mode may be used in the MPM list derivation process.
      iii. In one example, intra mode of CIIP coded blocks may be not stored and CIIP coded blocks may be considered as unavailable in the decoding process. Alternatively, CIIP coded blocks may be treated in the same way as normal inter mode.
   c. Alternatively, furthermore, it is proposed to remove CIIP flag from memory to save required memory size for storing mode information.
7. It is proposed that CIIP mode flag is coded by bypass coding.
   a. Alternatively, CIIP mode flag may be context coded but without referring to neighboring blocks' CIIP mode flags.
8. It is proposed that the approach to do the weighted sum in CIIP may depend on the color components.
   a. For example, the weighting values in CIIP are different for the main color component (e.g., G component) and other color components (e.g., B and R components).
   b. For example, the weighting values in CIIP are different for luma component and the chroma components.
   c. For example, the weighting values for inter prediction and intra prediction are equal on the chroma components.
9. It is proposed that when the weighting factor selection is according to neighboring blocks, for a neighboring block, if coded as CIIP mode, it may be treated as the inter coded block.
   a. Alternatively, when the weighting factor selection is according to neighboring blocks, for a neighboring block, if coded as CIIP mode, it may be treated as the intra coded block.
10. The above proposed method may be applied under certain conditions, such as block sizes, slice/picture/tile types, or motion information.
    a. In one example, when a block size contains smaller than M*H samples, e.g., 16 or 32 or 64 luma samples, proposed method is not allowed.
    b. Alternatively, when minimum size of a block's width or/and height is smaller than or no larger than X, proposed method is not allowed. In one example, X is set to 8.
    c. Alternatively, when minimum size of a block's width or/and height is no smaller than X, proposed method is not allowed. In one example, X is set to 8.
    d. Alternatively, when a block's width>th1 or >=th1 and/or a block's height>th2 or >=th2, proposed method is not allowed. In one example, th1 and/or th2 is set to 8.
    e. Alternatively, when a block's width<th1 or <=th1 and/or a block's height<th2 or <a=th2, proposed method is not allowed. In one example, th1 and/or th2 is set to 8.
11. The number of allowed weight pairs (wIntra, wInter) used in CIIP may be reduced from 3 to 2, denoted as (a, b) and (c, d).
    a. In one example, two pairs are defined as {(1,3) and (3,1)}; or {(1,3) and (2, 2)}; or {(3,1) and (2, 2)}; or {(3, 5) and (4, 4)} or {(5, 3) and (4, 4)}, or {(1, 7) and (4, 4)} or {(7, 1) and (4, 4)}.
    b. In one example, the weight pair is determined based on only one neighboring block A.

i. In one example, if one neighboring block A is available and intra coded, (wIntra, wInter) is set equal to (a, b); Otherwise, (wIntra, wInter) is set equal to (c, d).
ii. In one example, block A is a left neighbouring block.
iii. In one example, block A is an above neighbouring block.
c. In one example, the weight pair is determined based on two or more neighboring blocks and for at least one of the neighboring blocks, certain conditions are satisfied.
i. In one example, if at least one of the neighboring block A and B is available and intra coded, (wIntra, wInter) is set equal to (a, b); Otherwise, (wIntra, wInter) is set equal to (c, d).
1. In one example, block A is a left neighbouring block and B is an above neighbouring block.
d. In one example, the weight pair is determined based on two or more neighboring blocks and for each of the neighboring block, same conditions are satisfied.
i. In one example, if the neighboring block A and B are both available and intra coded, (wIntra, wInter) is set equal to (a, b); Otherwise, (wIntra, wInter) is set equal to (c, d).
1. In one example, block A is a left neighbouring block and B is an above neighbouring block.
e. In one example, the settings of (a, b) and (c, d) may be as follows:
1. In one example, (a, b) is set to (2, 2) or (3, 1).
2. In one example, (c, d) is set equal to (1, 3).
3. In one example, at least one of the two conditions is true: a is unequal to c or b is unequal to d.
4. (a, b) is unequal to (c, d).
f. In one example, the neighboring block (e.g., A or B) mentioned above is an adjacent or non-adjacent spatial neighboring block or a temporal neighboring block.
i. In one example, neighboring block A or B is the left (or top) neighboring block.
ii. In one example, neighboring block A and B are the left and top neighboring blocks, respectively.
iii. In one example, the left neighbor block covers the location (xCb−1, yCb+cbHeight−1).
iv. In one example, the top neighbor block covers the location (xCb+cbWidth−1, yCb−1).
v. In one example, the left neighbor block covers the location (xCb−1, yCb).
vi. In one example, the top neighbor block covers the location (xCb, yCb−1).
g. For the above examples, the CIIP prediction is formed as follows:

$$P_{CIIP}=(winter*P_{inter}+wIntra*P_{intra}+\text{offset})>>N$$

wherein offset is set to (1<<(N−1)) or 0, and N may be set to log 2(wIntra+wInter).
12. The number of allowed weight pairs (wIntra, wInter) used in CLIP may be reduced from 3 to 1.
a. In one example, the one weight pair is defined as (1,3) or (2, 2) or (1,7) or (2, 6) or (3, 5) or (4, 4).
b. In one example, (wIntra, wInter) is set equal to (2, 2).
c. In one example, (wIntra, wInter) is set equal to (1, 3).
d. For the above examples, the CIIP prediction is formed as follows:

$$P_{CIIP}=(wInter*P_{inter}+wIntra*P_{intra}+\text{offset})>>N$$

wherein offset is set to (1<<(N−1)) or 0, and N may be set to log 2(wIntra+wInter).
13. The (wIntra, wInter) weight pairs may be derived based on whether one or multiple neighboring blocks are coded with CIIP mode.
a. The weight pair used for current block may be derived from that used for a previously coded block.
b. In one example, the weight pair is determined based on only one neighboring block A.
i. In one example, if one neighboring block A is coded with CIIP mode, (wIntra, wInter) of current block is set equal to (wIntra, wInter) of the neighbor block A; otherwise, if the neighboring block A is available and intra coded, (wIntra, wInter) is set equal to (a, b); otherwise, (wIntra, wInter) is set equal to (c, d).
ii. In one example, if one neighboring block A is coded with CIIP mode, (wIntra, wInter) of current block is set equal to (wIntra, wInter) of the neighbor; otherwise, (wIntra, wInter) is set equal to (a, b).
iii. For above examples, the following may apply:
1. In one example, (a, b) is set equal to (2, 2) or (3, 1).
2. In one example, (c, d) is set equal to (1, 3).
3. In one example, at least one of the two conditions is true: a is unequal to c; b is unequal to d.
c. In one example, the weight pair is determined based on two or more neighboring blocks and for at least one of the neighboring blocks, certain conditions are satisfied.
i. Multiple neighboring blocks may be checked in a given checking order (e.g., firstly check left block, then check top block) to identify the usage of CIIP mode.
ii. In one example, if at least one of the neighboring block A and B is coded with CIIP mode, (wIntra, wInter) of current block is set equal to (wIntra, wInter) of first CIIP coded neighboring block in a given checking order; otherwise, if at least one neighboring block of A and B is available and intra coded, (wIntra, wInter) is set equal to (a, b); otherwise, (wIntra, wInter) is set equal to (c, d).
iii. For above examples, the following may apply:
1. In one example, (a, b) is set equal to (2, 2) or (3, 1).
2. In one example, (c, d) is set equal to (1, 3).
3. In one example, at least one of the two conditions is true: a is unequal to c; b is unequal to d.
iv. In one example, if at least one of the neighboring block A and B is coded with CIIP mode, (wIntra, wInter) of current block is set equal to (wIntra, wInter) of first CIIP coded neighboring block in a given checking order; otherwise, if neighboring blocks A and B are both available and intra coded, (wIntra, wInter) is set equal to (a, b); otherwise, (wIntra, wInter) is set equal to (c, d).
v. In one example, if at least one of the neighboring block A and B is coded with CIIP mode, (wIntra, wInter) of current block is set equal to (wIntra, wInter) of first CIIP coded neighboring block in a given checking order; otherwise, (wIntra, wInter) is set equal to (c, d).

vi. For above examples, the following may apply:
 1. In one example, (c, d) is set equal to (2, 2) or (1, 3).
d. In one example, the neighboring block A or B mentioned above is an adjacent or non-adjacent spatial neighboring block or a temporal neighboring block.
 i. In one example, neighboring block A or B is the left (or top) neighboring block.
 ii. In one example, neighboring block A and B are the left and top neighboring blocks, respectively.
 iii. In one example, the left neighbor block covers the location (xCb−1, yCb+cbHeight−1).
 iv. In one example, the top neighbor block covers the location (xCb+cbWidth−1, yCb−1).
 v. In one example, the left neighbor block covers the location (xCb−1, yCb).
 vi. In one example, the top neighbor block covers the location (xCb, yCb−1).
e. For the above examples, the CIIP prediction is formed as follows:

$P_{CIIP}=(wInter*P_{inter}+wIntra*P_{intra}+offset)>>N$ wherein offset is set to (1<<(N−1)) or 0, and N may be set to log 2(wIntra+wInter).
14. The selection of neighboring blocks used in CIIP may be dependent on coded information, such as block dimension/block shape/low delay check flag/reference pictures information/motion information of current block and neighboring blocks/intra prediction modes of neighboring blocks.
15. The weight pairs used in CIIP may be dependent on coded information, such as block dimension/block shape/low delay check flag/reference pictures information/motion information of current block and neighboring blocks/intra prediction modes of neighboring blocks.
 a. In one example, the set of weighting pairs is further signaled.
 b. In one example, selection of weight pair may depend on whether a neighboring block is inter coded instead of intra coded.
16. When determining the CIIP information, (e.g., in determination of weights applied to intra prediction signal or inter prediction signal for prior design and bullets mentioned above), if a neighbouring block is not coded with MODE_INTRA (i.e., intra mode), it may be treated as intra-coded.
 a. In one example, if the neighboring block is IBC coded.
 b. In one example, if the neighboring block is CIIP coded.
 c. In one example, if the neighboring block is TPM coded.
 d. In one example, if the neighboring block is Palette coded.
 e. In one example, if the neighboring block is RDPCM coded.
 f. In one example, if the neighboring block is coded without transform (e.g., transform skip mode) and/or quantization applied (e.g., transform bypass quantization mode).
 g. Alternatively, if the neighboring block is coded with a mode mentioned in above sub-bullets (e.g., IBC, RDPCM, Palette), the neighboring block may be treated as non-intra coded (e.g., inter-coded).
 h. In one example, if the neighboring block is intra coded but NOT coded with certain prediction modes (e.g., Planar), the neighboring block may be treated as non-intra coded (e.g., inter-coded).
 i. Alternatively, if the neighboring block is coded with the matrix based intra prediction method and/or multiple reference lines intra prediction method with reference line index unequal to K (e.g., K=0) and/or BDPCM, the neighboring block may be treated as non-intra coded (e.g., inter-coded).
 j. The proposed methods may be applied to other coding tools which rely on whether a neighboring block is coded with intra mode or not.
 k. The proposed methods may be applied to other coding tools which rely on whether a neighboring block is coded with inter mode or not.
17. Whether to enable or disable the above methods may be signaled in SPS/PPS/VPS/sequence header/picture header/slice header/tile group header/tile/group of CTUs, etc. al.
 a. Alternatively, which method to be used may be signaled in SPS/PPS/VPS/sequence header/picture header/slice header/tile group header/group of CTUs, etc. al.
 b. Alternatively, whether to enable or disable the above methods and/or which method to be applied may be dependent on block dimension, video processing data unit (VPDU), picture type, low delay check flag, coded information of current block (such as reference pictures, uni or bi-prediction) or previously coded blocks.

5. EMBODIMENTS 5.1 Embodiment 1

An example of skipping checking of CIIP flags of previously coded blocks is given as follows.
8.4.2 Derivation Process for Luma Intra Prediction Mode
Input to this process are:
 a luma location (xCb, yCb) specifying the top-left sample of the current luma coding block relative to the top-left luma sample of the current picture,
 a variable cbWidth specifying the width of the current coding block in luma samples,
 a variable cbHeight specifying the height of the current coding block in luma samples.
In this process, the luma intra prediction mode IntraPredModeY[xCb][yCb] is derived.
Table 8-1 specifies the value for the intra prediction mode IntraPredModeY[xCb][yCb] and the associated names.

TABLE 8-1

Specification of intra prediction mode and associated names

| Intra prediction mode | Associated name |
| --- | --- |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

NOTE—: The intra prediction modes INTRA_LT_CCLM, INTRA_L_CCLM and INTRA_T_CCLM are only applicable to chroma components.

IntraPredModeY[xCb][yCb] is derived by the following ordered steps:
1. The neighbouring locations (xNbA, yNbA) and (xNbB, yNbB) are set equal to (xCb−1, yCb+cbHeight−1) and (xCb+cbWidth−1, yCb−1), respectively.
2. For X being replaced by either A or B, the variables candIntraPredModeX are derived as follows:
   The availability derivation process for a block as specified in clause 6.4.X [Ed. (BB): Neighbouring blocks availability checking process tbd] is invoked with the location (xCurr, yCurr) set equal to (xCb, yCb) and the neighbouring location (xNbY, yNbY) set equal to (xNbX, yNbX) as inputs, and the output is assigned to availableX.
   The candidate intra prediction mode candIntraPredModeX is derived as follows:
   If one or more of the following conditions are true, candIntraPredModeX is set equal to INTRA_PLANAR.
      The variable availableX is equal to FALSE.
      CuPredMode[xNbX][yNbX] is not equal to MODE_INTRA.
      pcm_flag[xNbX][yNbX] is equal to 1.
      X is equal to B and yCb−1 is less than ((yCb>>CtbLog2SizeY)<<CtbLog2SizeY).
   Otherwise, candIntraPredModeX is set equal to IntraPredModeY[xNbX][yNbX].
3. The variables ispDefaultMode1 and ispDefaultMode2 are defined as follows:
   If IntraSubPartitionsSplitType is equal to ISP_HOR_SPLIT, ispDefaultMode1 is set equal to INTRA_ANGULAR18 and ispDefaultMode2 is set equal to INTRA_ANGULAR5.
   Otherwise, ispDefaultMode1 is set equal to INTRA_ANGULAR50 and ispDefaultMode2 is set equal to INTRA_ANGULAR63.
4. The candModeList[x] with x=0 . . . 5 is derived as follows:
. . .

Embodiment #2

If the left neighbor is available and intra coded, (wIntra, wInter) is set equal to (2, 2); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #3

If the left neighbor is available and intra coded, (wIntra, wInter) is set equal to (3, 1); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #4

If the top neighbor is available and intra coded, (wIntra, wInter) is set equal to (2, 2); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #5

If the top neighbor is available and intra coded, (wIntra, wInter) is set equal to (3, 1); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #6

If the left and top neighbor are available and intra coded, (wIntra, wInter) is set equal to (2, 2); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #7

If the left and top neighbor are available and intra coded, (wIntra, wInter) is set equal to (3, 1); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #8

If the left or top neighbor is available and intra coded, (wIntra, wInter) is set equal to (2, 2); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #9

If the left or top neighbor is available and intra coded, (wIntra, wInter) is set equal to (3, 1); Otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #10

(wIntra, wInter) is set equal to (2, 2).
The CIIP prediction is formed as follows:

$$P_{CIIP}=(w\text{Inter}*P_{inter}+w\text{Intra}*P_{intra}+2)>>2$$

Embodiment #11

(wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #12

If left neighbor is CIIP coded, (wIntra, wInter) of current block is set equal to (wIntra, wInter) of left neighbor; otherwise, if the left neighbor is available and intra coded, (wIntra, wInter) is set equal to (3, 1); otherwise, (wIntra, wInter) is set equal to (1, 3).

The CIIP prediction is formed as follows:

$$P_{CIIP}=(w\text{Inter}*P_{inter}+w\text{Intra}*P_{intra}+2)>>2$$

Embodiment #13

If left neighbor is CIIP coded, (wIntra, wInter) of current block is set equal to (wIntra, wInter) of left neighbor; otherwise, if the left neighbor is available and intra coded, (wIntra, wInter) is set equal to (2, 2); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #14

If top neighbor is CIIP coded, (wIntra, wInter) of current block is set equal to (wIntra, wInter) of top neighbor; otherwise, if the top neighbor is available and intra coded, (wIntra, wInter) is set equal to (3, 1); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #15

If top neighbor is CIIP coded, (wIntra, wInter) of current block is set equal to (wIntra, wInter) of top neighbor; otherwise, if the top neighbor is available and intra coded, (wIntra, wInter) is set equal to (2, 2); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #16

If left or/and top neighbor is/are CIIP coded, (wIntra, wInter) of current block is set equal to (wIntra, wInter) of first CIIP coded neighbor(left→top); otherwise, if the left or/and top neighbor is/are available and intra coded, (wIntra, wInter) is set equal to (3, 1); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #17

If left or/and top neighbor is/are CIIP coded, (wIntra, wInter) of current block is set equal to (wIntra, wInter) of first CIIP coded neighbor(left→top); otherwise, if the left or/and top neighbor is/are available and intra coded, (wIntra, wInter) is set equal to (2, 2); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #18

If left neighbor is CIIP coded, (wIntra, wInter) of current block is set equal to (wIntra, wInter) of left neighbor; otherwise, (wIntra, wInter) is set equal to (1, 3).

The CIIP prediction is formed as follows:

$$P_{CIIP}=(w\text{Inter}*P_{inter}+w\text{Intra}*P_{intra}+2)>>2$$

Embodiment #19

If left neighbor is CIIP coded, (wIntra, wInter) of current block is set equal to (wIntra, wInter) of left neighbor; otherwise, (wIntra, wInter) is set equal to (2, 2).
The CIIP prediction is formed as follows:

$$P_{CIIP}=(w\text{Inter}*P_{inter}+w\text{Intra}*P_{intra}+2)>>2$$

Embodiment #20

If top neighbor is CIIP coded, (wIntra, wInter) of current block is set equal to (wIntra, wInter) of top neighbor; otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #21

If top neighbor is CIIP coded, (wIntra, wInter) of current block is set equal to (wIntra, wInter) of top neighbor; otherwise, (wIntra, wInter) is set equal to (2, 2).
The CIIP prediction is formed as follows:

$$P_{CIIP}=(w\text{Inter}*P_{inter}+w\text{Intra}*P_{intra}+2)>>2$$

Embodiment #22

If left or/and top neighbor is/are CIIP coded, (wIntra, wInter) of current block is set equal to (wIntra, wInter) of first CIIP coded neighbor(left→top); otherwise, (wIntra, wInter) is set equal to (1, 3).
The CIIP prediction is formed as follows:

$$P_{CIIP}=(w\text{Inter}*P_{inter}+w\text{Intra}*P_{intra}+2)>>2$$

Embodiment #23

If left or/and top neighbor is/are CIIP coded, (wIntra, wInter) of current block is set equal to (wIntra, wInter) of first CIIP coded neighbor(left→top); otherwise, (wIntra, wInter) is set equal to (2, 2).
The CIIP prediction is formed as follows:

$$P_{CIIP}=(w\text{Inter}*P_{inter}+w\text{Intra}*P_{intra}+2)>>2$$

Embodiment #24

8.5.6 Decoding Process for Inter Blocks
8.5.6.1 General
This process is invoked when decoding a coding unit coded in inter prediction mode.
When ciip_flag[xCb][yCb] is equal to 1, the array predSamples of prediction samples is modified as follows:
    If cIdx is equal to 0, the following applies:
        The general intra sample prediction process as specified in clause 8.4.5.2.5 is invoked with the location (xTbCmp, yTbCmp) set equal to (xCb, yCb), the intra prediction mode predModeIntra set equal to IntraPredModeY[xCb][yCb], the transform block width nTbW and height nTbH set equal to cbWidth and cbHeight, the coding block width nCbW and height nCbH set equal to cbWidth and cbHeight, and the variable cIdx as inputs, and the output is assigned to the (cbWidth)×(cbHeight) array predSamplesIntra$_L$.

The weighted sample prediction process for combined merge and intra prediction as specified in clause 8.5.6.7 is invoked with the location (xTbCmp, yTbCmp) set equal to (xCb, yCb), the coding block width cbWidth, the coding block height cbHeight, the sample arrays predSamplesInter and predSamplesIntra set equal to predSamples and predSamplesIntra$_L$, respectively, the intra prediction mode predModeIntra set equal to IntraPredModeY[xCb][yCb], and the colour component index cIdx as inputs, and the output is assigned to the (cbWidth)×(cbHeight) array predSamples.

. . .

8.5.6.7 Weighted Sample Prediction Process for Combined Merge and Intra Prediction
Inputs to this process are:
  a luma location (xCb, yCb) specifying the top-left sample of the current luma coding block relative to the top left luma sample of the current picture,
  the width of the current coding block cbWidth,
  the height of the current coding block cbHeight,
  two (cbWidth)×(cbHeight) arrays predSamplesInter and predSamplesIntra,
  a variable cIdx specifying the colour component index.
Output of this process is the (cbWidth)×(cbHeight) array predSamplesComb of prediction sample values.
The variable bitDepth is derived as follows:
  If cIdx is equal to 0, bitDepth is set equal to BitDepth$_Y$.
  Otherwise, bitDepth is set equal to BitDepth$_C$.
The variable scallFact is derived as follows:

$$\text{scallFact}=(cIdx==0)?0:1. \tag{8-838}$$

Figure 18:
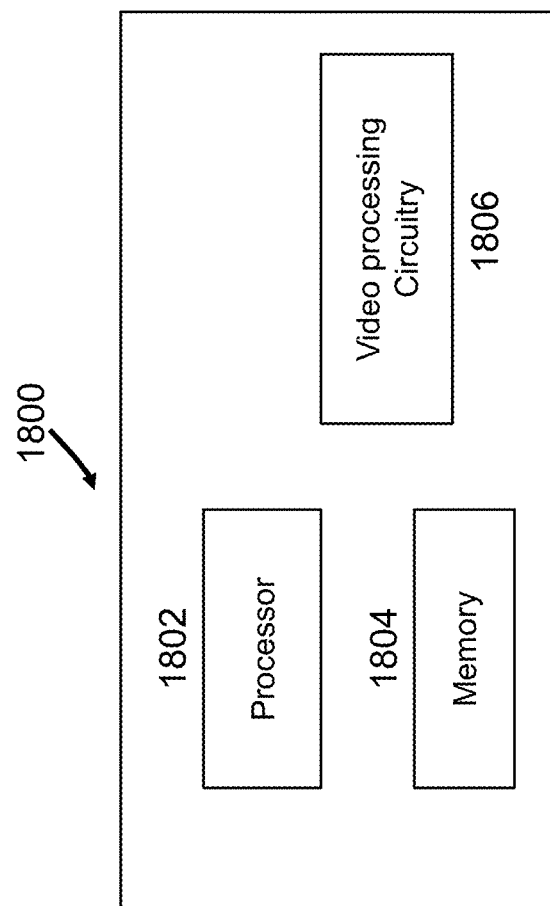
FIG. 18 is a block diagram of an example of a video processing apparatus.

The neighbouring luma locations (xNbA, yNbA) and (xNbB, yNbB) are set equal to (xCb−1, yCb−1+(cbHeight<<scallFact)) and (xCb−1+(cbWidth<<scallFact), yCb−1), respectively.
For X being replaced by either A or B, the variables availableX and isIntraCodedNeighbourX are derived as follows:
  The derivation process for neighbouring block availability as specified in clause 6.4.4 is invoked with the location (xCurr, yCurr) set equal to (xCb, yCb), the neighbouring location (xNbY, yNbY) set equal to (xNbX, yNbX), checkPredModeY set equal to FALSE, and cIdx set equal to 0 as inputs, and the output is assigned to availableX.
  The variable isIntraCodedNeighbourX is derived as follows:
    If availableX is equal to TRUE and CuPredMode[0][xNbX][yNbX] is equal to MODE_INTRA and BdpcmFlag[xNbX][yNbX] is equal to 0, isIntraCodedNeighbourX is set equal to TRUE.
    Otherwise, isIntraCodedNeighbourX is set equal to FALSE.
The weight w is derived as follows:
  If isIntraCodedNeighbourA and isIntraCodedNeighbourB are both equal to TRUE, w is set equal to 3.
  Otherwise, if isIntraCodedNeighbourA and isIntraCodedNeighbourB are both equal to to FALSE, w is set equal to 1.
  Otherwise, w is set equal to 2.
When cIdx is equal to 0 and slice_lmcs_enabled_flag is equal to 1, predSamplesInter[x][y] with x=0 . . . cbWidth−1 and y=0 . . . cbHeight−1 are modified as follows:

FIG. 18 is a block diagram of a video processing apparatus 1800. The apparatus 1800 may be used to implement one or more of the methods described herein. The apparatus 1800 may be embodied in a smartphone, tablet, computer, Internet of Things (IoT) receiver, and so on. The apparatus 1800 may include one or more processors 1802, one or more memories 1804 and video processing hardware 1806. The processor(s) 1802 may be configured to implement one or more methods described in the present document. The memory (memories) 1804 may be used for storing data and code used for implementing the methods and techniques described herein. The video processing hardware 1806 may be used to implement, in hardware circuitry, some techniques described in the present document.

Figure 20:
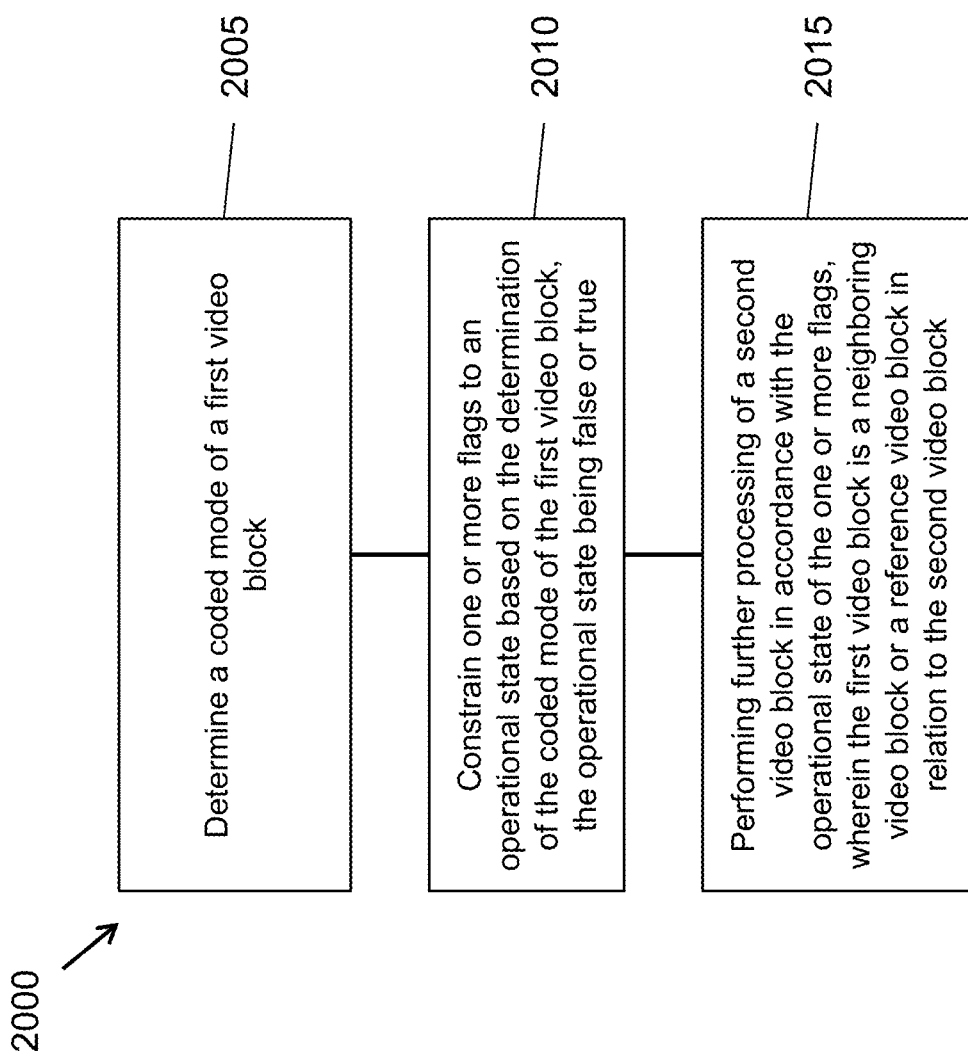
FIG. 20 is a flowchart for an example of a video processing method.

FIG. 20 is a flowchart for a method 2000 of processing a video. The method 2000 includes determining (2005) a coded mode of a first video block, constraining (2110) one or more flags to an operational state based on the determination of the coded mode of the first video block, the operational state being false or true, and performing (2015) further processing of a second video block in accordance with the operational state of the one or more flags, wherein the first video block is a neighboring video block or a reference video block in relation to the second video block.

Figure 21:
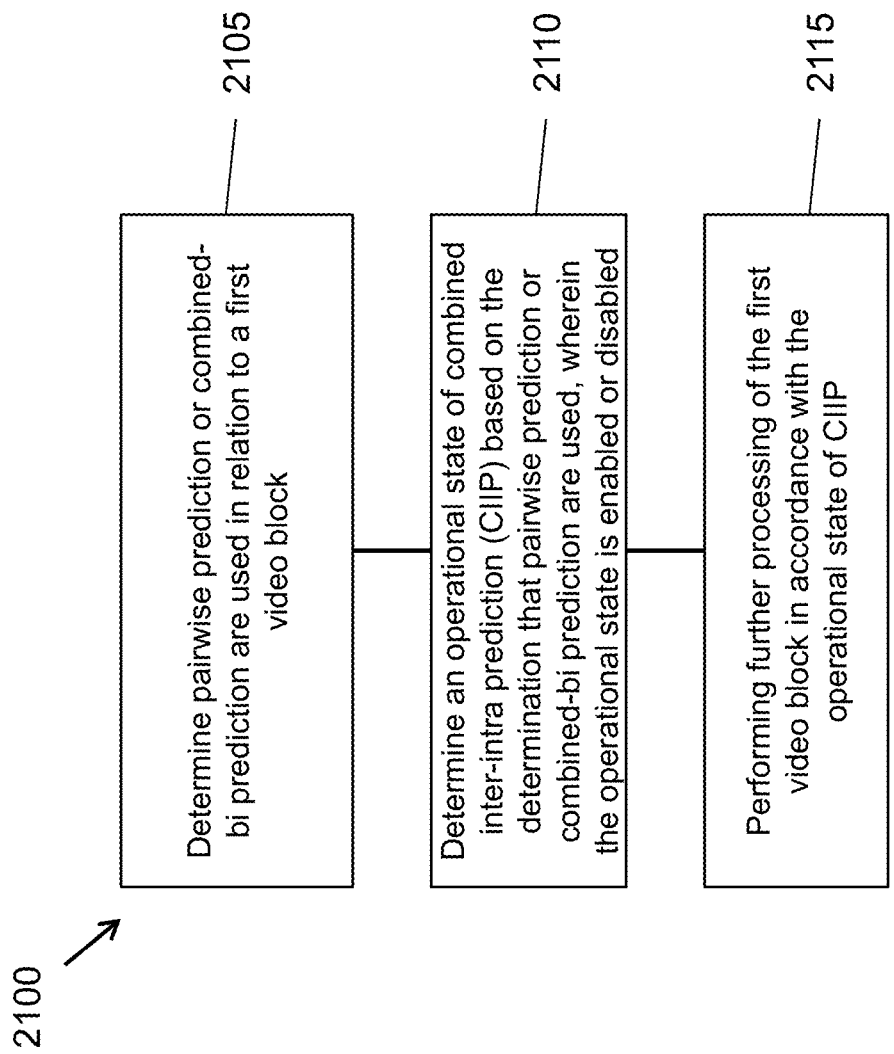
FIG. 21 is a flowchart for an example of a video processing method.

FIG. 21 is a flowchart for a method 2100 of processing a video. The method 2100 includes determining (2105) pairwise prediction or combined-bi prediction are used in relation to a first video block, determining (2110) an operational state of combined inter-intra prediction (CIIP) based on the determination that pairwise prediction or combined-bi prediction are used, wherein the operational state is enabled or disabled, and performing (2115) further processing of the first video block in accordance with the operational state of CIIP.

Figure 23:
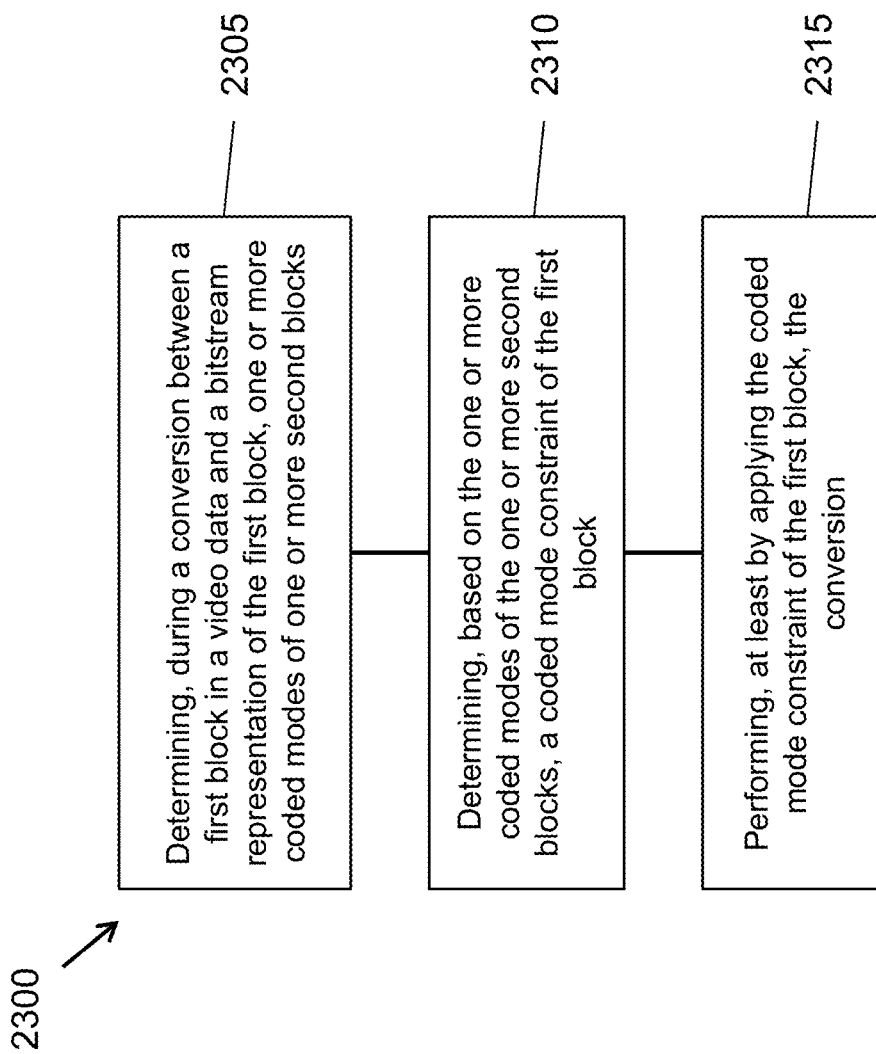
FIG. 23 is a flowchart for an example of a video processing method.

FIG. 23 is a flowchart for a method 2300 of processing a video. The method 2300 includes determining (2305), during a conversion between a first block in a video data and a bitstream representation of the first block, one or more coded modes of one or more second blocks; determining (2310), based on the one or more coded modes of the one or more second blocks, a coded mode constraint of the first block; performing (2315), at least by applying the coded mode constraint of the first block, the conversion; wherein the one or more second blocks comprise at least one of an adjacent block, a non-adjacent block, and a reference block of the first block.

Figure 24:
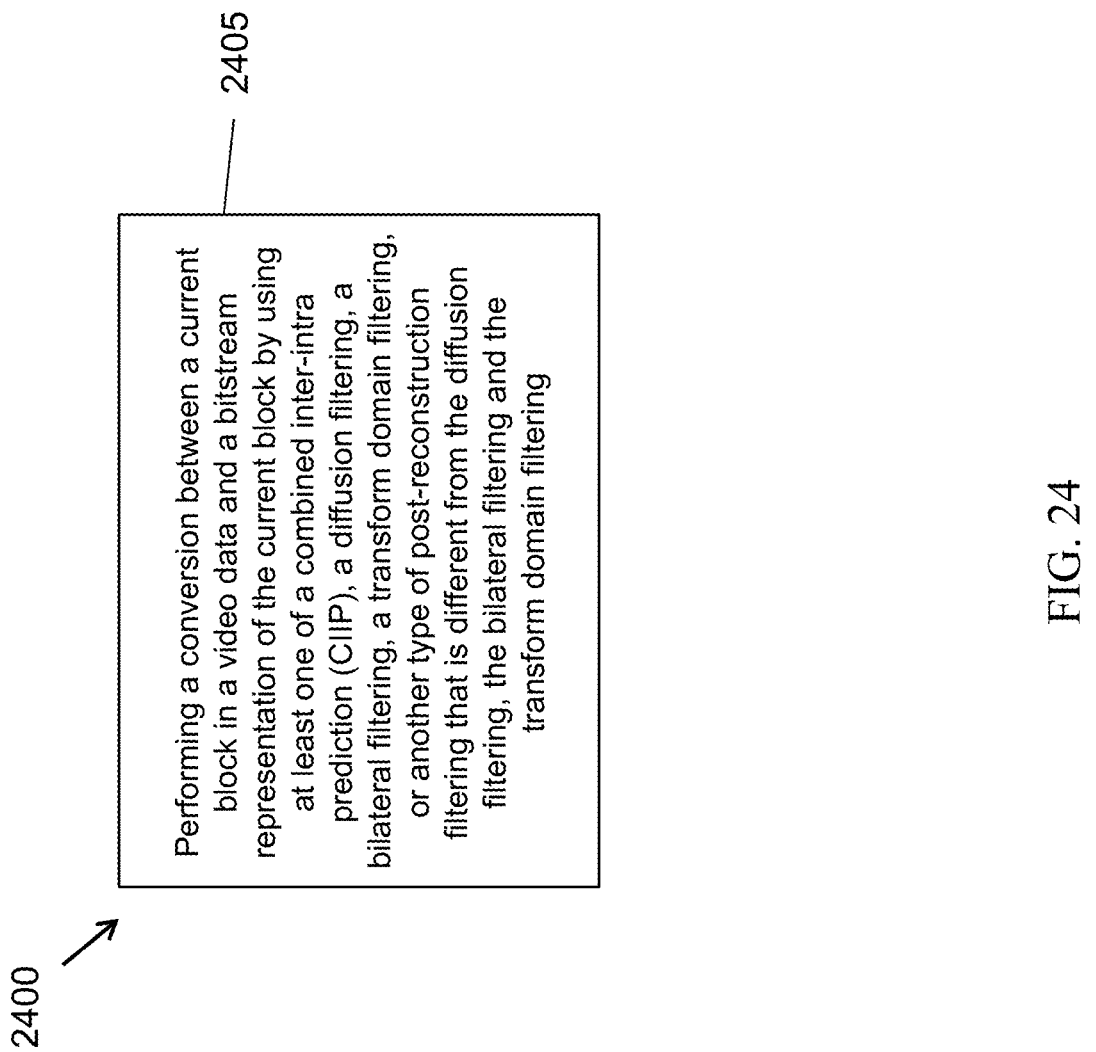
FIG. 24 is a flowchart for an example of a video processing method.

FIG. 24 is a flowchart for a method 2400 of processing a video. The method 2400 includes performing (2405) a conversion between a current block in a video data and a bitstream representation of the current block by using at least one of a combined inter-intra prediction (CIIP), a diffusion filtering, a bilateral filtering, a transform domain filtering, or another type of post-reconstruction filtering that is different from the diffusion filtering, the bilateral filtering and the transform domain filtering, wherein reconstructed neighboring samples of the current block used in at least one of the combined inter-intra prediction (CIIP), the diffusion filtering, the bilateral filtering, the transform domain filtering, or the another type of post-reconstruction filtering are replaced by approximated samples generated from the corresponding samples of the reconstructed neighboring samples in one or more reference pictures.

Figure 25:
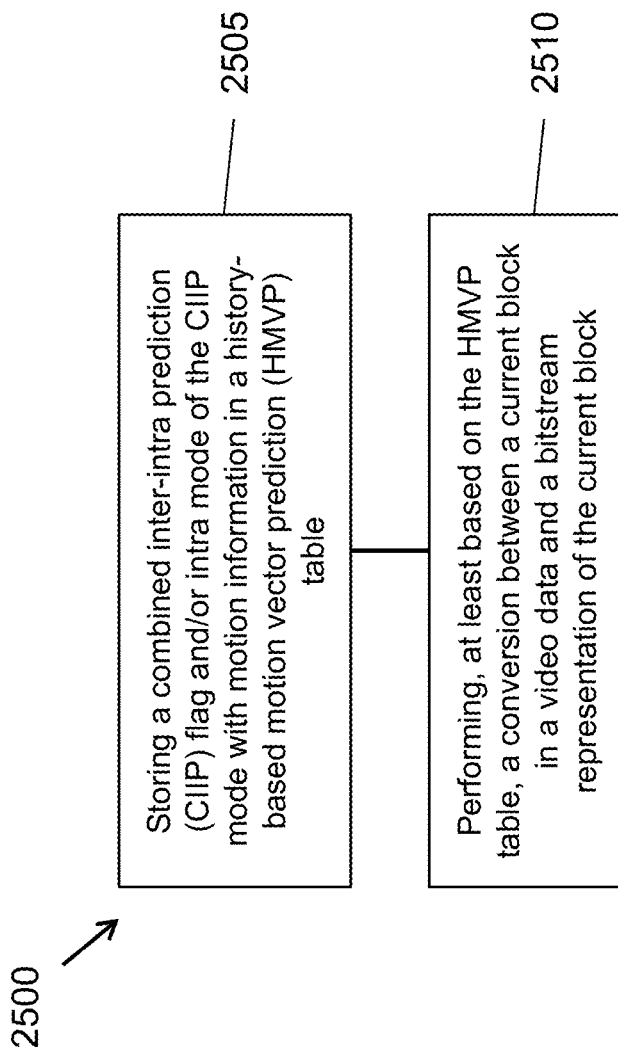
FIG. 25 is a flowchart for an example of a video processing method.

FIG. 25 is a flowchart for a method 2500 of processing a video. The method 2500 includes storing (2505) a combined inter-intra prediction (CIIP) flag and/or intra mode of the CIIP mode with motion information in a history-based motion vector prediction (HMVP) table; and performing, at least based on the HMVP table, a conversion between a current block in a video data and a bitstream representation of the current block.

Figure 26:
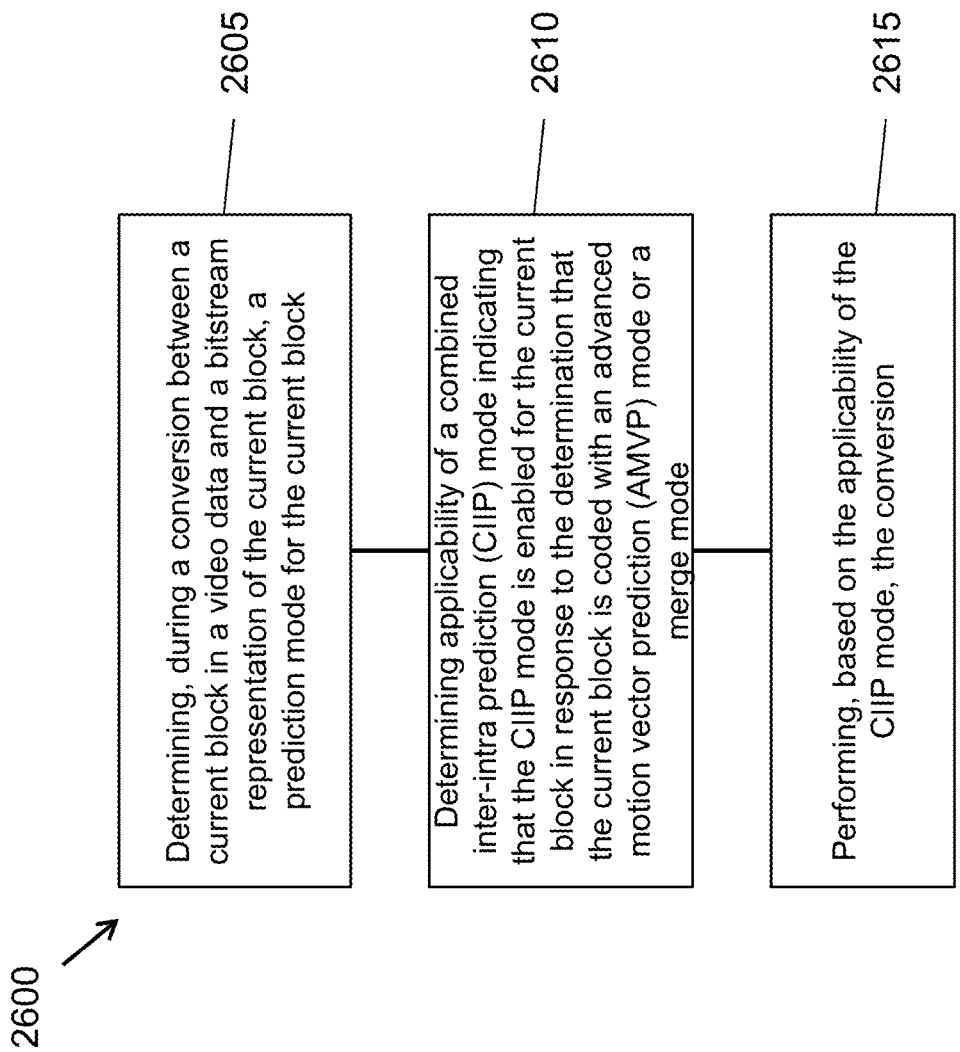
FIG. 26 is a flowchart for an example of a video processing method.

FIG. 26 is a flowchart for a method 2600 of processing a video. The method 2600 includes determining (2605), during a conversion between a current block in a video data and a bitstream representation of the current block, a prediction mode for the current block; determining (2610) applicability of a combined inter-intra prediction (CIIP) mode indicating that the CIIP mode is enabled for the current block in response to the determination that the current block is coded with an advanced motion vector prediction (AMVP) mode or a merge mode; and performing (2615), based on the applicability of the CIIP mode, the conversion.

Figure 27:
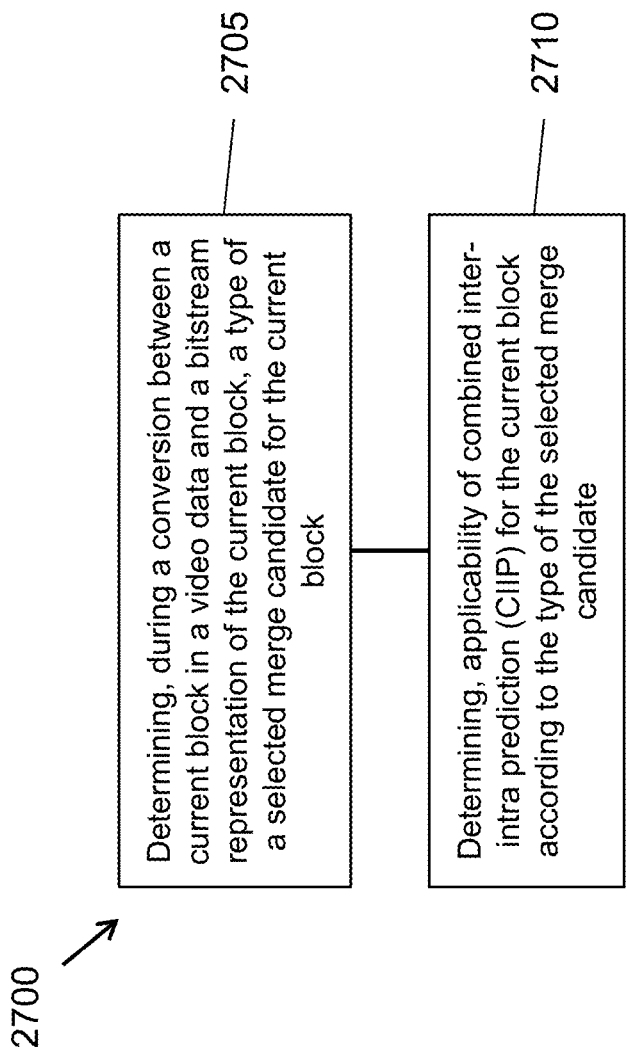
FIG. 27 is a flowchart for an example of a video processing method.

FIG. 27 is a flowchart for a method 2700 of processing a video. The method 2700 includes determining (2705), during a conversion between a current block in a video data and a bitstream representation of the current block, a type of a selected merge candidate for the current block; determining (2710), applicability of combined inter-intra prediction (CIIP) for the current block according to the type of the selected merge candidate, wherein the current block is coded in merge mode.

With reference to methods 2000 and 2100, some examples of combined intra inter prediction for encoding and their use are described in Section 4 of the present document. For example, as described in Section 4, video blocks can be processed using in accordance with a combined intra inter prediction.

With reference to methods 2000 and 2100, a video block may be encoded in the video bitstream in which bit efficiency may be achieved by using a bitstream generation rule related to a combined intra inter prediction.

The methods can include wherein the one or more flags include a combined inter-intra prediction (CIIP) flag, a local illumination compensation (LIC) flag, a diffusion filtering flag, a bilateral filtering flag, a transform domain filter flag, or another type of post-reconstruction filter flag.

The methods can include wherein the one or more flags includes a first flag related to a first operation, the first flag is derived to be false, and the first operation is not applied.

The methods can include wherein usage of the first operation is signaled to be skipped.

The methods can include wherein usage of the first operation is signaled to be constrained to be false in a conformance bitstream.

The methods can include wherein the first video block is within a neighboring row or column in relation to the second video block.

The methods can include wherein the neighboring row includes an above row or above-right row.

The methods can include wherein the neighboring column includes a left column, a below-left column, or an above-left corner column.

The methods can include wherein the coded mode includes intra mode, CIIP mode, or CPR mode.

The methods can include determining a position of the second video block, and wherein constraining the one or more flags to the false state is also based on the determination of the position of the second video block.

The methods can include wherein the position is at a top of a current coding tree unit (CTU) and an above neighboring block of the second video block is within a different CTU.

The methods can include wherein the position is at a left side of a current coding tree unit (CTU) and a left neighboring block of the second video block is within a different CTU.

The methods can include wherein the one or more flags include a CIIP flag or an intra mode of CIIP mode flag, and data related to the one or more flags are stored with motion information in a history-based motion vector prediction (HMVP) table.

The methods can include comparing motion information of two candidates, and wherein the CIIP flag or the intra mode CIIP mode flag are not used in the comparison of the motion information.

The methods can include comparing motion information of two candidates, and wherein the CIIP flag or the intra mode CIIP mode flag are used in the comparison of the motion information.

The methods can include determining that a merge candidate is from an entry in the HMVP table; and copying a CIIP flag of the entry to the merge candidate.

The methods can include determining that a merge candidate is from an entry in the HMVP table; and copying a CIIP flag and an intra mode of the entry to the merge candidate.

The methods can include wherein a flag of the one or more flags is related to CIIP, and the CIIP is performed for advanced motion vector prediction (AMVP).

The methods can include wherein a CIIP flag and an intra mode flag are signaled for AMVP mode.

The methods can include wherein a CIIP flag is inherited in merge mode or UMVE mode, the CIIP flag includes an operational state of true, more than one intra mode are allowed in CIIP, and an intra mode is signaled based on the more than one intra mode allowed in CIIP.

The methods can include wherein a CIIP flag and an intra mode of neighboring or non-adjacent video blocks in merge mode or UMVE mode are inherited by the second video block.

The methods can include wherein CIIP is disabled for skip mode.

The methods can include comparing information related to two candidates, and wherein the CIIP flag or the intra mode CIIP mode flag are not used in the comparison of the information.

The methods can include comparing information related to two candidates, and wherein the CIIP flag or the intra mode CIIP mode flag are used in the comparison of the information.

The methods can include wherein one or more candidates involved in pairwise prediction or combined-bi prediction adopt CIIP prediction, and wherein the operational state is enabled.

The methods can include wherein intra mode of one of the two candidates is inherited.

The methods can include wherein intra mode is signaled.

The methods can include wherein two candidates are involved in pairwise prediction or combined-bi prediction.

The methods can include wherein reconstructed samples used in CIIP mode, a diffusion filter, a bilateral filter, a transform domain filter, or other types of post-reconstruction filters are replaced by samples in reference pictures.

The methods can include wherein the second video block is bi-predicted, and neighboring samples of two reference blocks are averaged to generate final neighboring samples.

The methods can include wherein the second video block is bi-predicted, and neighboring samples of two reference blocks are used as final neighboring samples.

The methods can include wherein the second video block is bi-predicted, and neighboring samples of two reference blocks are weighted averaged to generate final neighboring samples based on unequal-weight generalized bi-prediction (GBI) or weighted prediction LIC are applied to the second video block.

The methods can include wherein samples in reference pictures are identified by motion information of the second video block.

The methods can include wherein samples in reference pictures are identified by motion information of the second video block.

The methods can include wherein a motion vector is rounded to integer precision and used for identifying the samples.

The methods can include wherein the samples are in reference pictures that are identified by motion vectors in integer-pel precision.

The methods can include determining characteristics of the second video block, the characteristics include one or more of a block size, a slice type, a picture type, a tile type, or motion information, and wherein constraining the operational state is based on the determination of the characteristics.

The methods can include wherein the methods are signaled in a sequence parameter set (SPS), a view parameter set (VPS), a picture parameter set (PPS), a sequence header, a picture header, a slice header, a tile group header, a tile, or a group of CTUs.

The following listing of solutions further provides embodiments and variations to the items listed in the previous section (e.g., items 11 to 16).

40. A method of video processing comprising: performing a conversion between a video block of a video and a coded representation of the video block using a combine intra and inter prediction mode in which the coded representation corresponds to a weighted average of intra and inter prediction results of the video block using a weight pair from a set of weight pairs in which less than three pairs are included.

41. The method of solution 40, wherein the set of weight pairs corresponds to two pairs.

42. The method of any of solutions 40-41, wherein the weight pairs are determined based on a single neighboring block.

43. The method of any of solutions 40-41, wherein the weight pairs are determined based on multiple neighboring blocks.

44. The method of solution 40, wherein the set of weight pairs includes exactly one pair.

45. The method of solution 44, wherein the one pair is one of (1,3) or (2, 2) or (1,7) or (2, 6) or (3, 5) or (4, 4).

46. A method of video processing comprising: performing a conversion between a video block of a video and a coded representation of the video block using a combine intra and inter prediction mode in which the coded representation corresponds to a weighted average of intra and inter prediction results of the video block using a weight pair from a set of weight pairs determined due to coding information of one or more neighboring blocks.

47. The method of solution 46, wherein the set of weight pairs is determined due to exactly one neighboring block.

48. The method of solution 46, wherein the set of weight pairs is determined due to two or more neighboring blocks.

49. The method of any of solutions 40-48, wherein the conversion includes encoding the video to generate the coded representation.

50. The method of any of solutions 40-48, wherein the conversion includes decoding the coded representation to generate the video.

Various other embodiments and additional features of these methods can be described using the following clause-based recitation.

1. A method for processing video, comprising:
determining, during a conversion between a first block in a video data and a bitstream representation of the first block, one or more coded modes of one or more second blocks;
determining, based on the one or more coded modes of the one or more second blocks, a coded mode constraint of the first block; and
performing, at least by applying the coded mode constraint of the first block, the conversion;
wherein the one or more second blocks comprise at least one of an adjacent block, a non-adjacent block, and a reference block of the first block.

2. The method of clause 1, wherein determining a coded mode constraint of the first block comprises:
determining, based on the one or more coded modes of the one or more second blocks, one or more flags which correspond to one or more coded modes of the first block respectively.

3. The method of clause 2, wherein the one or more coded modes comprise:
a combined inter-intra prediction (CIIP) mode, a local illumination compensation (LIC) mode, a diffusion filtering mode, a bilateral filtering mode, a transform domain filtering mode, or a post-reconstruction filtering mode that is different from the diffusion filtering mode, the bilateral filtering mode and the transform domain filtering mode.

4. The method of anyone of clauses 2-3, wherein the coded mode constraint of the first block comprises:
a first coded mode among the one or more coded modes of the first block is disabled, when a first flag corresponding to the first coded mode is derived to be false.

5. The method of anyone of clauses 2-4, wherein the coded mode constraint of the first block comprises:
information indicating whether or not a second coded mode among the one or more coded modes of the first block is enabled is not signaled, when a second flag corresponding to the second coded mode is derived to be false.

6. The method of anyone of clauses 2-5, wherein the coded mode constraint of the first block comprises:
information indicating whether or not a third coded mode among the one or more coded modes of the first block is enabled is signaled and constrained to be false in a conformance bitstream, when a third flag corresponding to the third coded mode is derived to be false.

7. The method of anyone of clauses 1-6, further comprising:
determining whether to apply the coded mode constraint of the first block.

8. The method of clause 7, wherein determining whether to apply the coded mode constraint of the first block comprises:
determining whether to apply the coded mode constraint of the first block according to coded modes of neighboring rows or columns of the first block.

9. The method of clause 7, wherein determining whether to apply the coded mode constraint of the first block comprises:
determining whether to apply the coded mode constraint of the first block according to at least N samples in neighboring rows or neighboring columns of the first block which are not coded with a fourth mode, and $N \geq 1$.

10. The method of clause 8 or 9, wherein the neighboring row comprises an above row and an above-right row of the first block.

11. The method of anyone of clauses 8-10, wherein the neighboring column comprises a left column, a below-left column, and an above-left corner column of the first block.

12. The method of anyone of clauses 7-11, wherein determining whether to apply the coded mode constraint of the first block comprises:
determining the coded mode constraint of the first block is to be applied when any neighboring non-adjacent block is coded with a fourth mode.

13. The method of anyone of clauses 7-11, wherein determining whether to apply the coded mode constraint of the first block comprises:
determining the coded mode constraint of the first block is to be applied when all of neighboring non-adjacent blocks are coded with a fourth mode.

14. The method of anyone of clauses 7-11, wherein determining whether to apply the coded mode constraint of the first block comprises:
determining the coded mode constraint of the first block is not to be applied when at least M neighboring non-adjacent blocks are not coded with a fourth mode, and M is a predefined first threshold.

15. The method of anyone of clauses 9-14, wherein the fourth coded mode comprises at least one of an intra-prediction mode, a combined inter-intra prediction (CIIP) mode, and a current picture referencing (CPR) mode.

16. The method of anyone of clauses 7-14, wherein determining whether to apply the coded mode constraint of the first block comprises:
determining whether to apply the coded mode constraint of the first block according to a position of the first block.

17. The method of clause 16, wherein determining whether to apply the coded mode constraint of the first block according to a position of the first block comprises:
determining the coded mode constraint of the first block is not to be applied when the position is on the top of a current coding tree unit (CTU), and an above neighboring block and the first block belong to different CTUs.

18. The method of clause 16, wherein determining whether to apply the coded mode constraint of the first block according to a position of the first block comprises:
determining the coded mode constraint of the first block is not to be applied when the position is on the left of a current coding tree unit (CTU), and a left neighboring block and the first block belong to different CTUs.

19. The method of anyone of clauses 1-18, further comprising:
determining characteristic of the current block; and
determining to apply the coded mode constraint of the current block when the characteristic of the current block satisfies a predefined condition.

20. The method of anyone of clauses 1-18, further comprising:
determining characteristics of the current block and/or previously coded blocks; and
determining whether to apply the coded mode constraint of the current block according to the characteristics of the current block and/or previously coded blocks 21. A method for processing video, comprising:
performing a conversion between a current block in a video data and a bitstream representation of the current block by using at least one of a combined inter-intra prediction (CIIP), a diffusion filtering, a bilateral filtering, a transform domain filtering, or another type of post-reconstruction filtering that is different from the diffusion filtering, the bilateral filtering and the transform domain filtering,
wherein reconstructed neighboring samples of the current block used in at least one of the combined inter-intra prediction (CIIP), the diffusion filtering, the bilateral filtering, the transform domain filtering, or the another type of post-reconstruction filtering are replaced by approximated samples generated from the corresponding samples of the reconstructed neighboring samples in one or more reference pictures.

22. The method of clause 21, wherein neighboring samples of two reference blocks of the current block are averaged to generate the approximated samples when the current block is bi-predicted.

23. The method of clause 21, wherein neighboring samples of one reference block of the current block are used as the approximated samples when the current block is bi-predicted or uni-predicted.

24. The method of clause 21, wherein neighboring samples of two reference blocks of the current block are weighted averaged to generate the approximated samples when the current block is bi-predicted and at least one of an unequal-weight generalized bi-prediction (GBI), a weighted prediction and a local illumination compensation (LIC) is applied to the current block.

25. The method of clause 22-24, wherein the neighboring samples of the reference blocks of the current block are identified by motion information of the current block.

26. The method of clause 22-24, wherein the neighboring samples of the reference blocks of the current block are identified by modified motion information of the current block.

27. The method of clause 24, wherein the modified motion information of the current block is a modified motion vector which is rounded to integer precision.

28. The method of clause 21, wherein the neighboring samples of the reference blocks of the current block are identified by motion vectors in integer-pel precision.

29. The method of clause 28, wherein motion vectors of the reconstructed neighboring samples are rounded to integer precision so as to identify the corresponding samples.

30. The method of anyone of clauses 21-29, wherein reconstructed neighboring samples of the current block are replaced by the approximated samples only when the current block is coded with integer-pel precision.

31. The method of anyone of clauses 21-30, wherein reconstructed neighboring samples of the current block are replaced by the approximated samples for luma component or chroma component only.

32. The method of anyone of clauses 19-31, further comprising:
determining characteristic of the current block; and
determining to replace the reconstructed neighboring samples with the approximated samples when the characteristic of the current block satisfies a predefined condition.

33. The method of clause 19 or 32, wherein the characteristic of the current block comprises at least one of a block size, a slice type, a picture type, a tile type and motion information.

34. The method of clause 33, wherein the predefined condition is that the current block contains samples not smaller than a predefined second threshold.

35. The method of clause 33, wherein the predefined condition is that a width and a height of the current block is greater than a predefined third threshold.

36. The method of clause 33, wherein the predefined condition is that a width and a height of the current block is smaller than a predefined fourth threshold.

37. The method of clause 33, wherein the predefined condition is that a width of the current block is smaller than a predefined fifth threshold and/or a height of the current block is smaller than a predefined sixth threshold.

38. The method of clause 33, wherein the predefined condition is that a width of the current block is greater than a predefined seventh threshold and/or a height of the current block is greater than a predefined eighth threshold.

39. The method of clause 38, wherein information indicating whether to apply the coded mode constraint of the current block and/or to replace the reconstructed neighboring samples with the approximated samples in a sequence parameter set (SPS), in a view parameter set (VPS), a picture parameter set (PPS), a sequence header, a picture header, a slice header, a tile group header, a tile, or a group of CTUs is signaled.

40. The method of anyone of clauses 21-39, further comprising:

determining characteristics of the current block and/or previously coded blocks; and determining whether to replace the reconstructed neighboring samples with the approximated samples according to the characteristics of the current block and/or previously coded blocks.

41. The method of clause 20 or 40, wherein the characteristics of the current block and/or previously coded blocks comprise at least one of a block dimension, a video processing data unit (VPDU), a picture type, a low delay check flag, coded information of current block and/or the previously coded blocks.

42. The method of clause 41, wherein the coded information of current block and/or the previously coded blocks indicates reference pictures, an uni-prediction or a bi-prediction.

43. A video processing apparatus comprising a processor configured to implement a method recited in anyone of clauses 1 to 42.

44. The apparatus of clause 43, wherein the apparatus is a video encoder.

45. The apparatus of clause 43, wherein the apparatus is a video decoder.

46. A computer readable recoding media on which a program comprising code is recorded, the program is for a processor to carry out a method recited in anyone of clauses 1 to 42.

Various other embodiments and additional features of these methods can be described using the following clause-based recitation.

1. A method for processing video, comprising:

storing a combined inter-intra prediction (CIIP) flag and/or intra mode of the CIIP mode with motion information in a history-based motion vector prediction (HMVP) table; and performing, at least based on the HMVP table, a conversion between a current block in a video data and a bitstream representation of the current block.

2. The method of clause 1, further comprising:

comparing motion information of two candidates, wherein the CIIP flag and/or the intra mode of the CIIP mode are not used in the comparison of the motion information of two candidates.

3. The method of clause 1, further comprising:

comparing motion information of two candidates, wherein the CIIP flag and/or the intra mode of the CIIP mode are used in the comparison of the motion information of two candidates.

4. The method of anyone of clauses 1-3, wherein the performing comprises:

when a merge candidate is from an entry in the HMVP table, copying the CIIP flag of the entry to the merge candidate.

5. The method of anyone of clauses 1-3, wherein the performing comprises:

when a merge candidate is from an entry in the HMVP table, copying the CIIP flag and the intra mode of the entry to the merge candidate.

6. A method for processing video, comprising:

determining, during a conversion between a current block in a video data and a bitstream representation of the current block, a prediction mode for the current block;

determining applicability of a combined inter-intra prediction (CIIP) mode indicating that the CIIP mode is enabled for the current block in response to the determination that the current block is coded with an advanced motion vector prediction (AMVP) mode or a merge mode; and performing, based on the applicability of the CIIP mode, the conversion.

7. The method of clause 6, wherein a CIIP flag and/or intra mode of the CIIP mode are signaled when the current block is coded with the AMVP mode.

8. The method of clause 6 or 7, wherein a CIIP flag and/or intra mode of the CIIP mode of adjacent neighboring blocks and/or non-adjacent neighboring blocks are inherited in a merge mode and/or an merge with motion vector difference (MMVD) mode of the current block.

9. The method of anyone of clauses 6-8, wherein a CIIP flag and/or intra mode of the CIIP mode for a non-skip merge mode and/or a non-skip MMVD mode is signaled, and the CIIP flag and/or intra mode of the CIIP mode of adjacent neighboring blocks and/or non-adjacent neighboring blocks are inherited in a skip merge mode and/or a skip MMVD mode.

10. The method of anyone of clauses 6-8, wherein a CIIP flag and/or intra mode of the CIIP mode for a skip merge mode and/or a skip MMVD mode is signaled, and the CIIP flag and/or intra mode of the CIIP mode of adjacent neighboring blocks and/or non-adjacent neighboring blocks are inherited in a non-skip merge mode and/or a non-skip MMVD mode.

11. The method of anyone of clauses 6-10, wherein the CIIP flag is inherited in a merge mode and/or a skip MMVD mode.

12. The method of clause 11, wherein the intra mode is signaled when the CIIP flag is true and more than one intra mode are allowed in the CIIP mode.

13. The method of anyone of clauses 6-12, wherein a CIIP flag and/or intra mode of the CIIP mode of adjacent neighboring blocks and/or non-adjacent neighboring blocks coded in a merge mode and/or an MMVD mode are inherited by the current block.

14. The method of anyone of clauses 6-13, further comprising:

disabling the CIIP mode for a skip mode.

15. The method of anyone of clauses 6-13, further comprising:

comparing information of two merge candidates, wherein the CIIP flag and/or the intra mode of the CIIP mode are not used in the comparison of the information of two merge candidates.

16. The method of anyone of clauses 6-13, further comprising:
comparing information of two merge candidates,
wherein the CIIP flag and/or the intra mode of the CIIP mode are used in the comparison of the information of two merge candidates.

17. A method for processing video, comprising:
determining, during a conversion between a current block in a video data and a bitstream representation of the current block, a type of a selected merge candidate for the current block, and
determining, applicability of combined inter-intra prediction (CIIP) for the current block according to the type of the selected merge candidate,
wherein the current block is coded in merge mode.

18. The method of clause 17, wherein the CIIP is disabled when the selected merge candidate of the current block is at least one of a pairwise merge candidate, a combined-bi merge candidate, a zero motion merge candidate, or a virtual or artificial merge candidate.

19. The method of clause 17 or 18, wherein when one candidate involved in a pairwise merge candidate or the combined-bi merge candidate adopt the CIIP mode, the CIIP mode is enabled for the pairwise merge candidate or the combined-bi merge candidate.

20. The method of clause 19, wherein an intra mode of the involved CIIP mode candidate is inherited.

21. The method of clause 19, wherein an intra mode of the involved CIIP mode is signaled for the pair-wise merge candidate or the combined-bi merge candidate.

22. The method of clause 17 or 18, wherein when both candidates involved in a pairwise merge candidate or a combined-bi merge candidate adopt the CIIP mode, the CIIP mode is enabled for the pairwise merge candidate or the combined-bi merge candidate.

23. The method of clause 22, wherein an intra mode of one of the two involved candidates is inherited.

24. The method of clause 22, wherein an intra mode of the involved CIIP mode is derived from intra modes of the two involved candidates and is used for the pairwise merge candidate or the combined-bi merge candidate.

25. The method of clause 22, wherein an intra mode of the involved CIIP mode is signaled for the pairwise merge candidate or the combined-bi merge candidate.

26. A video processing apparatus comprising a processor configured to implement a method recited in anyone of clauses 1 to 25.

27. The apparatus of clause 26, wherein the apparatus is a video encoder.

28. The apparatus of clause 26, wherein the apparatus is a video decoder.

29. A computer readable recoding media on which a program comprising code is recorded, the program is for a processor to carry out a method recited in anyone of clauses 1 to 25.

It will be appreciated that the disclosed techniques may be embodied in video encoders or decoders to improve compression efficiency using hash-based motion estimation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method for processing video, comprising:
    making, during a conversion between a current block in a video data and a bitstream of the video data, a first determination on whether a first coding mode is applicable for the current block, wherein the first coding mode is a skip mode;
    making, according to the applicability of the first coding mode, a second determination on whether a second coding mode is applicable for the current block, wherein in the second coding mode, a prediction signal of the current block is generated based on at least a weighted average of an intra prediction signal of the current block and an inter prediction signal of the current block; and
    performing, based on the first determination and the second determination, the conversion,
    wherein the second coding mode is disabled if the first coding mode is applicable for the current block.

2. The method of claim 1, wherein the conversion comprises decoding the current block from the bitstream.

3. The method of claim 1, wherein the conversion comprises encoding the current block into the bitstream.

4. The method of claim 1, wherein the method further comprises:
    comparing first information of two candidates to determine whether to add at least one of the two candidates to a candidate list constructed for the current block;
    wherein the first information of two candidates does not comprise second information related with the second coding mode.

5. The method of claim 4, wherein the second information related to the second coding mode comprises at least one of:
    a flag of the second coding mode, or
    an intra mode which is used in the second coding mode.

6. The method of claim 4, wherein the two candidates comprise two spatial merge candidates.

7. The method of claim 4, wherein the two candidates comprise a spatial merge candidate in the candidate list and a candidate from a history-based motion vector prediction table.

8. The method of claim 4, wherein the two candidates comprise a spatial merge candidate and a temporal merge candidate.

9. The method of claim 1, wherein whether the second coding mode is applicable for the current block is further based on a type of a selected merge candidate for the current block.

10. The method of claim 1, wherein information related to the second coding mode is stored together with motion information in a history-based motion vector prediction table which is used to construct a candidate list for blocks in the video data.

11. An apparatus for processing video data comprising a processor and a non-transitory memory with instructions thereon, wherein the instructions upon execution by the processor, cause the processor to:
    make, during a conversion between a current block in a video data and a bitstream of the video data, a first determination on whether a first coding mode is applicable for the current block, wherein the first coding mode is a skip mode;
    make, according to the applicability of the first coding mode, a second determination on whether a second coding mode is applicable for the current block, wherein in the second coding mode, a prediction signal of the current block is generated based on at least a weighted average of an intra prediction signal of the current block and an inter prediction signal of the current block; and
    perform, based on the first determination and the second determination, the conversion,
    wherein the second coding mode is disabled if the first coding mode is applicable for the current block.

12. The apparatus of claim 11, wherein the processor is configured to:
    compare first information of two candidates to determine whether to add at least one of the two candidates to a candidate list constructed for the current block;
    wherein the first information of two candidates does not comprise second information related with the second coding mode.

13. The apparatus of claim 12, wherein the second information related to the second coding mode comprises at least one of:
    a flag of the second coding mode, or
    an intra mode which is used in the second coding mode.

14. The apparatus of claim 12, wherein the two candidates comprise two spatial merge candidates.

15. The apparatus of claim 12, wherein the two candidates comprise a spatial merge candidate in the candidate list and a candidate from a history-based motion vector prediction table.

16. The apparatus of claim 12, wherein the two candidates comprise a spatial merge candidate and a temporal merge candidate.

17. A non-transitory computer-readable storage medium storing instructions that cause a processor to:
    make, during a conversion between a current block in a video data and a bitstream of the video data, a first determination on whether a first coding mode is applicable for the current block, wherein the first coding mode is a skip mode;

make, according to the applicability of the first coding mode, a second determination on whether a second coding mode is applicable for the current block, wherein in the second coding mode, a prediction signal of the current block is generated based on at least a weighted average of an intra prediction signal of the current block and an inter prediction signal of the current block; and perform, based on the first determination and the second determination, the conversion, wherein the second coding mode is disabled if the first coding mode is applicable for the current block.

18. The non-transitory computer-readable storage medium of claim 17, wherein, the instructions further cause the processor to:

compare first information of two candidates to determine whether to add at least one of the two candidates to a candidate list constructed for the current block, wherein the first information of two candidates does not comprise second information related with the second coding mode.

19. The non-transitory computer-readable storage medium of claim 18, wherein the second information related to the second coding mode comprises at least one of:

a flag of the second coding mode, or an intra mode which is used in the second coding mode.

20. A non-transitory computer-readable recording medium storing a bitstream of a video data which is generated by a method performed by a video processing apparatus, wherein the method comprises:

making, during a conversion between a current block in a video data and a bitstream of the video data, a first determination on whether a first coding mode is applicable for the current block, wherein the first coding mode is a skip mode;

making, according to the applicability of the first coding mode, a second determination on whether a second coding mode is applicable for the current block, wherein in the second coding mode, a prediction signal of the current block is generated based on at least a weighted average of an intra prediction signal of the current block and an inter prediction signal of the current block; and generating the bitstream based on the first determination and the second determination, wherein the second coding mode is disabled if the first coding mode is applicable for the current block.

* * * * *